US010041815B2

(12) United States Patent
Hirata et al.

(10) Patent No.: US 10,041,815 B2
(45) Date of Patent: Aug. 7, 2018

(54) PHOTOELECTRIC ENCODER HAVING A TWO-LEVEL CODE PATTERN USING THREE OR MORE BIT-COMBINATION PATTERNS

(71) Applicant: Mitutoyo Corporation, Kawasaki, Kanagawa (JP)

(72) Inventors: Shu Hirata, Kawasaki (JP); Toru Yaku, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 32 days.

(21) Appl. No.: 15/464,546

(22) Filed: Mar. 21, 2017

(65) Prior Publication Data
US 2017/0276522 A1   Sep. 28, 2017

(30) Foreign Application Priority Data
Mar. 25, 2016   (JP) .................. 2016-062643

(51) Int. Cl.
*G01D 5/347*   (2006.01)

(52) U.S. Cl.
CPC ....... *G01D 5/3473* (2013.01); *G01D 5/34746* (2013.01)

(58) Field of Classification Search
CPC ........... G01D 5/34776; G01D 5/34792; G01D 5/3473; G01D 5/34746

USPC .................................................. 250/231.13
See application file for complete search history.

(56) References Cited

U.S. PATENT DOCUMENTS 6,987,465 B2 * 1/2006 Mittmann .......... G01D 5/24476
341/15

FOREIGN PATENT DOCUMENTS

JP          5553669          6/2014

* cited by examiner

*Primary Examiner* — Que T Le
(74) *Attorney, Agent, or Firm* — Rankin, Hill & Clark LLP

(57) ABSTRACT

A scale is provided with a two-level code pattern according to a pseudo random code sequence along a length measurement direction. Each code of the two-level code pattern indicates a code "1" or "0", each code includes two bits, and each bit of the two bits is L or H. The code "1" is represented by an A pattern which is a combination of L and H, and the code "0" is represented by a B pattern which is a combination of L and L or by a C pattern which is a combination of H and H. When the codes "0" are continued, the B pattern and the C pattern are alternately used. The scale is commonly used in a reflective type encoder or transmissive type encoder. A detection head part includes an inversion processing unit which performs inversion processing to a detection image of the scale as required.

6 Claims, 23 Drawing Sheets

Fig. 2A
RELATED ART
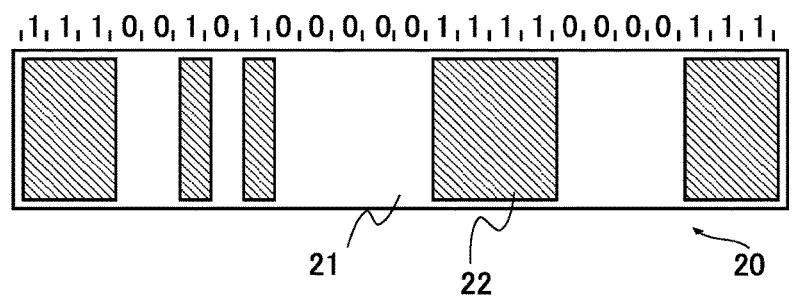
Fig. 2B
RELATED ART
(DETECTION IMAGE OF REFLECTIVE PHOTOELECTRIC ENCODER)
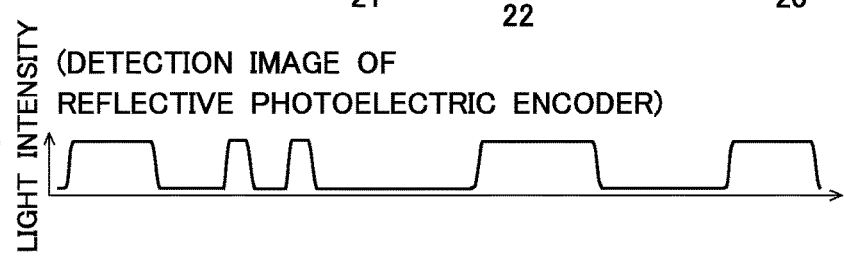
(BINARIZATION)
Fig. 2C
RELATED ART
(CODING)
Fig. 2D
RELATED ART
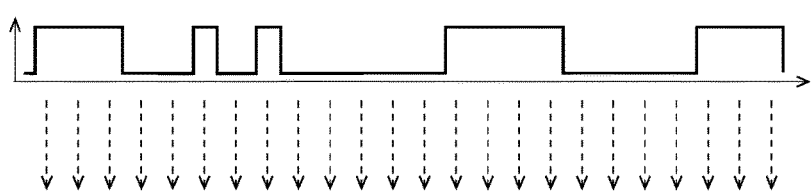

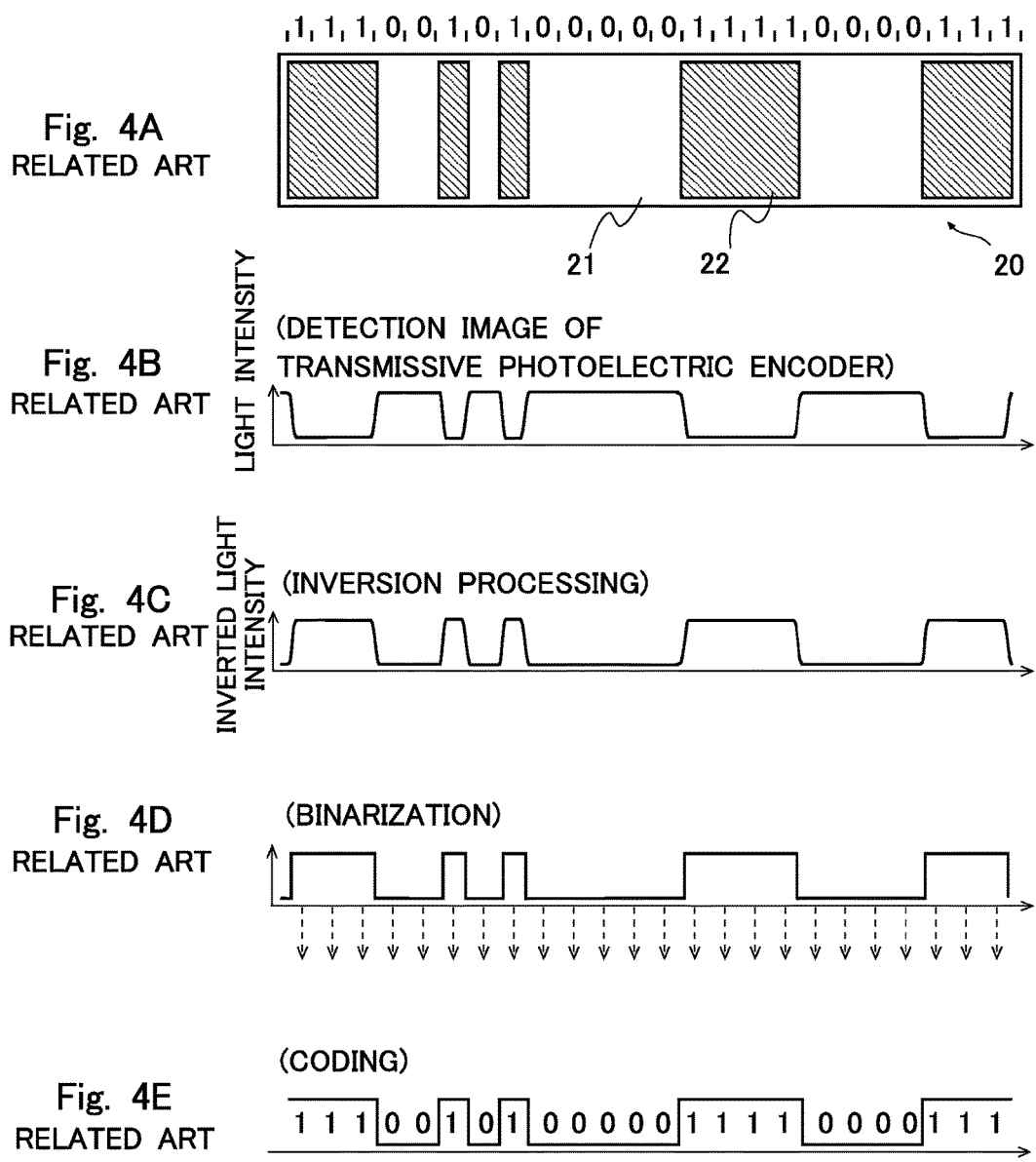

(DETECTION IMAGE OF
TRANSMISSIVE PHOTOELECTRIC ENCODER)

(INVERSION PROCESSING)

(BINARIZATION)

(CODING)

DATA DIFFERENT FROM THAT
IN REFLECTIVE PHOTOELECTRIC ENCODER
IS DETECTED

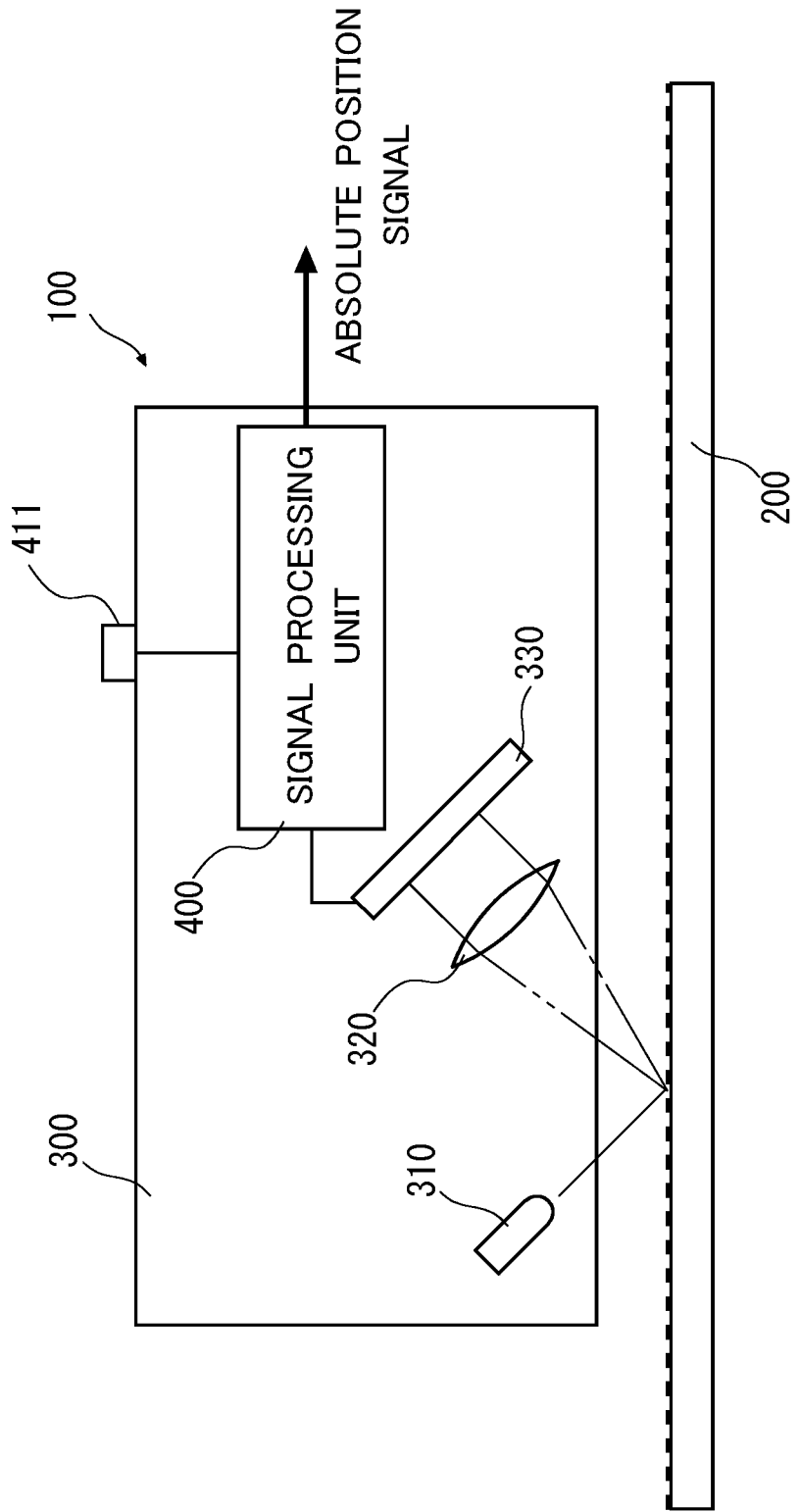

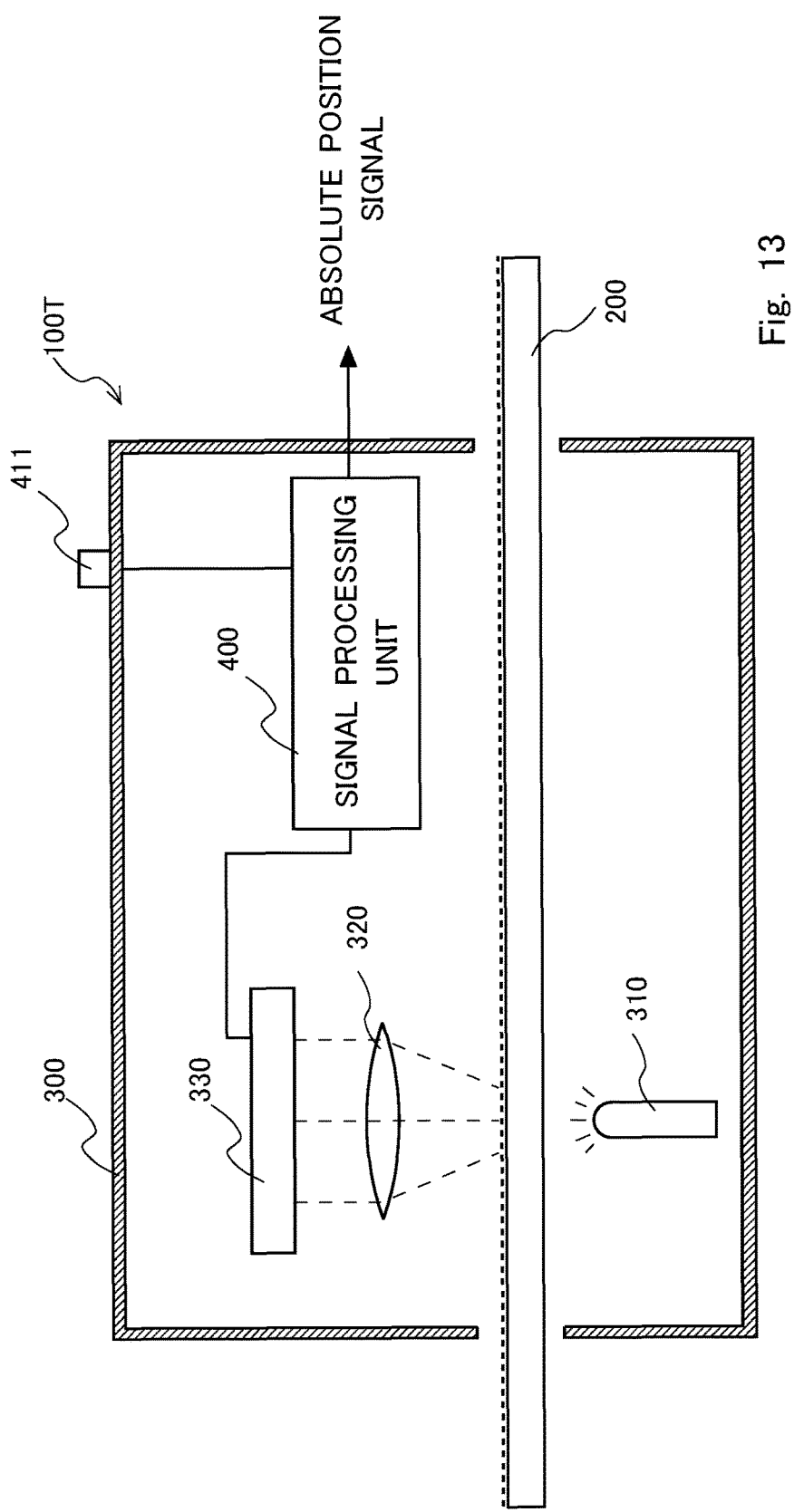

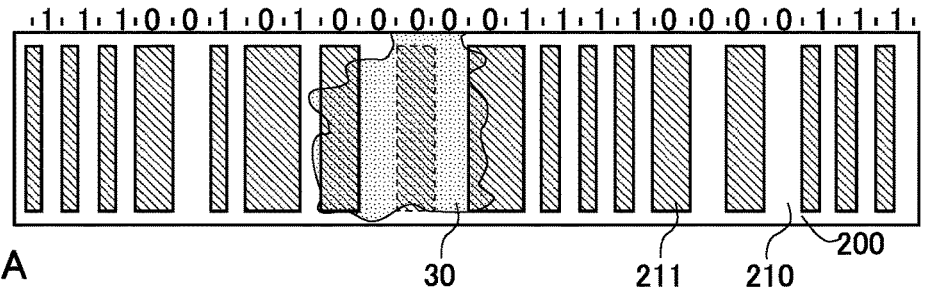
Fig. 14A
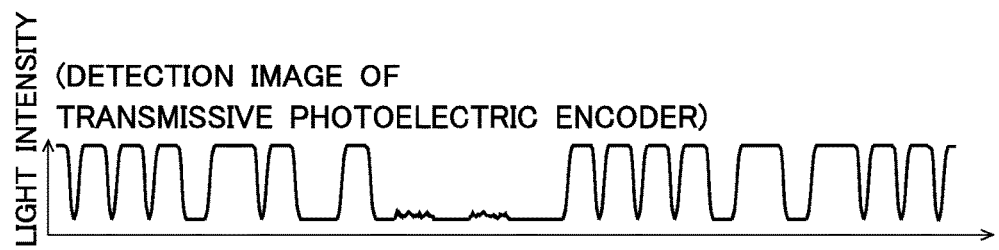
Fig. 14B
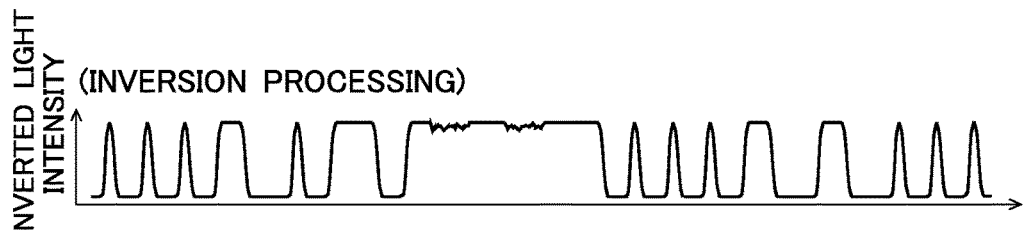
Fig. 14C
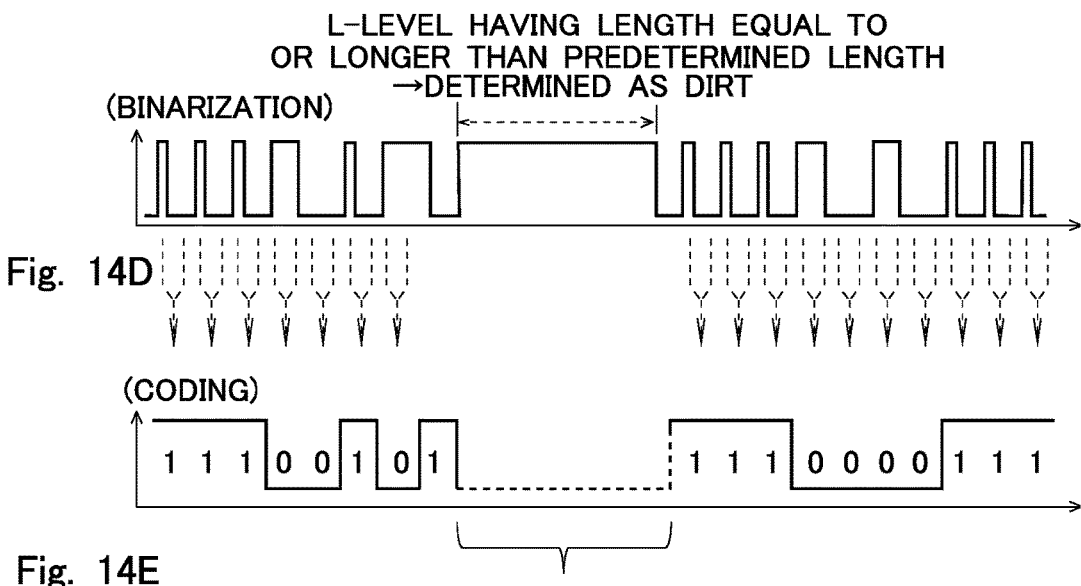
Fig. 14D
Fig. 14E
PART DETERMINED AS DIRT IS
NOT USED FOR CORRELATION CALCULATION "0"  or 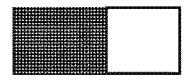 or  or 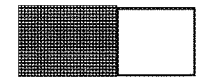
"1" 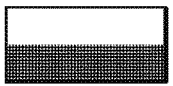 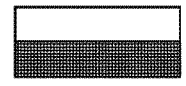  
Fig.16A  Fig.16B  Fig.16C  Fig.16D

US 10,041,815 B2

PHOTOELECTRIC ENCODER HAVING A TWO-LEVEL CODE PATTERN USING THREE OR MORE BIT-COMBINATION PATTERNS

INCORPORATION BY REFERENCE

This application is based upon and claims the benefit of priority from Japanese patent application No. 2016-062643, filed on Mar. 25, 2016, the disclosure of which are incorporated herein in its entirety by reference.

BACKGROUND OF THE INVENTION

1. Field of the Invention

The present invention relates to a position detection apparatus, and more specifically relates to a photoelectric encoder.

2. Description of Related Art

Photoelectric encoders have been widely used as a precision length-measuring device or a precision position detector (for example, JP 5553669 B).

A photoelectric encoder includes a scale and a detection head part provided to be relatively movable along the scale in a length measurement direction.

A bright/dark pattern is provided on the scale. FIG. 1 illustrates a scale 20. As illustrated in FIG. 1, a scale pattern is formed by arranging a predetermined patterned chromium film 22 on a glass substrate 21.

The photoelectric encoder has two types of a reflective type and a transmissive type.

In a reflective photoelectric encoder, a light source and a light receiving part are provided on the same side of a scale, and the light receiving part receives a bright/dark pattern of light reflected by the scale. In a transmissive photoelectric encoder, a light source and a light receiving part are provided on each side of a scale, and the light receiving part receives a bright/dark pattern of light transmitted through the scale.

The layout of the constituent elements in the reflective photoelectric encoder is different from that in the transmissive photoelectric encoder, and which causes difference in external size or shape of a product. The reflective photoelectric encoder or the transmissive photoelectric encoder is appropriately selected according to usage or an installation space of the photoelectric encoder.

SUMMARY OF THE INVENTION

A reflective photoelectric encoder and a transmissive photoelectric encoder basically have a common detection principle. That is, a relative position or an absolute position on a scale is to be calculated based on a bright/dark pattern of received light. Thus, it seems to be possible that most of main configuration parts are commonly used in both a transmissive type and a reflective type only by changing the layout of the parts. However, it has been impossible that the main configuration parts are commonly used in both the transmissive type and the reflective type.

The reason is described with examples.

It is assumed that the scale 20 of FIG. 1 is used as a scale 20 of a reflective photoelectric encoder 100 (see FIG. 2).

The scale 20 is what is called an absolute type (ABS) detection scale and has a scale pattern in which a code "1" and a code "0" is randomly arranged. The chromium film 22 is provided at the code "1", and the chromium film is not provided at the code "0" which is a glass part 21. In this case, the scale 20 is irradiated with light, the light is reflected by the chromium film 22, and transmitted through the glass part 21.

Consequently, when the light reflected by the scale 20 is received at a light receiving part, a bright/dark image pattern, in which the part of the chromium film 22 is to be a bright part and the part of the glass part 21 is to be a dark part, is obtained (see FIG. 2B).

FIG. 2B illustrates an example of a bright/dark image pattern formed on a light receiving surface of the light receiving part. The pattern is binarized with an appropriate threshold (FIG. 2C), and is further converted into a code string of the codes "1" and "0" (FIG. 2D). The position on the scale can be calculated from the code string by performing calculation processing (for example, pattern matching or the like) by a calculation unit.

Here, it is assumed that dirt 30 adheres to a part of the glass part 21 of the scale 20, or a part of the glass part 21 is scratched as illustrated in FIG. 3A.

It is assumed that the chromium film 22 is relatively stabler and has an antifouling effect more than the glass part 21 in this description. Naturally, it depends on material or the like of the scale which part of the bright part or the dark part is more easily missing, but this point is described in the end of the specification.

If the dirt 30 adheres to a part of the glass part 21 of the scale 20 as illustrated in FIG. 3A, the glass part 21 is originally the dark part, and the bright/dark image pattern is scarcely affected as illustrated in FIG. 3B.

Here, it is assumed that the scale 20 in FIG. 1 is used as a scale of a transmissive photoelectric encoder (see FIG. 4). In this case, when the scale 20 is irradiated with light, the chromium film 22 is to be a non-transmitting part, and the glass part 21 is to be a light transmitting part.

Thus, when the light transmitted through the scale 20 is received at the light receiving part, a bright/dark image pattern, in which the part of the chromium film 22 is to be the dark part and the part of the glass part 21 is to be the bright part, is obtained (see FIG. 4B).

In other words, the bright part and the dark part in the bright/dark image in the transmissive type are inversed compared with those in the reflective type. If it is desired to commonly use the scale 20 and an electrical circuit (calculation unit) in the reflective photoelectric encoder and the transmissive photoelectric encoder, inversion processing needs to be performed in the middle.

That is, the received light image pattern of FIG. 4B is inverted so as to be the pattern of FIG. 4C. Consequently, the patterns in binarization (FIG. 4D), coding (FIG. 4E), and calculation processing are exactly the same as those in the reflective photoelectric encoder.

Incidentally, it is assumed that the dirt 30 adheres to a part of the glass part 21 of the scale 20 or a part of the glass part 21 is scratched as illustrated in FIG. 5. Then, the image pattern of the transmitted light is partially missing (see FIG. 5B).

It is assumed that inversion processing (FIG. 5C), binarization (FIG. 5D), coding (FIG. 5E) are performed to the image pattern in the above manner. At this time, the image pattern includes a code error at the part of the dirt 30 which does not exist in the case of the reflective type. The code error affects calculation processing (for example, pattern matching or the like), and which means the transmissive type is more sensitive to dirt than the reflective type.

Considering actual products, equivalent performance is required in either the reflective type or the transmissive type, and it is not desirable that the transmissive type is relatively more sensitive to dirt than the reflective type.

Thus, it is not desirable that inversion processing is performed in the transmissive type to commonly use the electrical circuit (calculation unit) in the reflective type and the transmissive type.

If the electrical circuit (calculation unit) is to be commonly used, a scale pattern itself needs to be inverted as, for example, the example of FIG. 6. Considering this point, the scale and the electrical circuit (calculation unit) cannot be commonly used in the reflective photoelectric encoder and the transmissive photoelectric encoder simultaneously.

Consequently, a number of parts needs to be managed, and which largely affects the cost of a photoelectric encoder.

A purpose of the present invention is to commonly use a scale and an electrical circuit (calculation unit) in both a reflective photoelectric encoder and a transmissive photoelectric encoder, and to reduce the number of parts and costs.

A photoelectric encoder in an aspect of the present invention includes:

a scale provided with a two-level code pattern according to a pseudo random code sequence along a length measurement direction; and a detection head part which is provided so as to be relatively movable along the scale and detects an absolute position on the scale based on the pseudo random code sequence on the scale, in which each code in the two-level code pattern consists of a combination of two bits, the two-level code pattern is represented using three or more bit-combination patterns, each code of the two-level code pattern indicates a code "1" or a code "0", each code includes two bits, each bit of the two bits is L or H, either one of a light reflecting part or a light transmitting part is arranged at a position equivalent to the L on the scale, the other one of the light reflecting part or the light transmitting part is arranged at a position equivalent to the H on the scale, and the detection head part includes:

a light source which irradiates the scale with light;

an image acquiring unit which acquires a bright/dark detection image formed by light reflected by the scale or light transmitted through the scale;

an inversion processing unit which performs inversion processing to the detection image; and a correlation calculation unit which performs, based on the pseudo random code sequence, correlation calculation to bit data of the detection image and calculates the absolute position on the scale from a correlation peak.

In the photoelectric encoder in an aspect of the present invention, the inversion processing unit is set to ON when the correlation calculation unit is designed so as to perform the correlation calculation based on the detection image formed by the light reflected by the scale, and when the image acquiring unit acquires the detection image formed by the light transmitted through the scale, the inversion processing unit is set to ON when the correlation calculation unit is designed so as to perform the correlation calculation based on the detection image formed by the light transmitted through the scale, and when the image acquiring unit acquires the detection image formed by the light reflected by the scale, the inversion processing unit is set to OFF when the correlation calculation unit is designed so as to perform the correlation calculation based on the detection image formed by the light reflected by the scale, and the image acquiring unit acquires the detection image formed by the light reflected by the scale, and the inversion processing unit is set to OFF when the correlation calculation unit is designed so as to perform the correlation calculation based on the detection image formed by the light transmitted through the scale, and when the image acquiring unit acquires the detection image formed by the light transmitted through the scale.

In an aspect of the present invention, it is preferable that the inversion processing unit includes a setting selector switch which changes ON/OFF setting of the inversion processing.

In an aspect of the present invention, it is preferable that each code of the two-level code pattern indicates a code "1" or a code "0", each code includes two bits, each of the two bits is L or H, the number of continuous L in the two-level code pattern is equal to or less than an upper limit value, and the number of continuous H in the two-level code pattern is equal to or less than an upper limit value.

In an aspect of the present invention, it is preferable that two or more bit-combination patterns of the two bits representing the code "0" are prepared, and a bit-combination pattern different from an adjacent bit-combination pattern is used when the codes "0" are continued.

In an aspect of the present invention, it is preferable that the code "1" is represented by an A pattern which is a combination of L and H, the code "0" is represented by a B pattern which is a combination of L and L, or by a C pattern which is a combination of H and H, and the B pattern and the C pattern are alternately used when the codes "0" are continued.

In an aspect of the present invention, it is preferable that each code of the two-level code pattern indicates a code "1" or a code "0", each code includes two bits, each of the two bits is L, H, or M, the code "1" is represented by an A pattern which is a combination of L and H, the code "0" is represented by two or more patterns selected from a B pattern which is a combination of L and L, a C pattern which is a combination of H and H, and a D pattern which is a combination of M and M, and a bit-combination pattern different from an adjacent bit-combination pattern is used when the codes "0" are continued.

In an aspect of the present invention, it is preferable that the code "1" and the code "0" are replaceable with each other.

A position detection method for the photoelectric encoder in an aspect of the present invention, the method includes:

by the detection head part, acquiring, the detection image of the scale;

excluding a part in which the number of continuous L exceeds the upper limit value from the detection image as unreliable;

excluding a part in which the number of continuous H exceeds the upper limit value from the detection image as unreliable; and performing, based on the pseudo random code sequence, the correlation calculation using bit data which is not excluded from the detection image.

In an aspect of the present invention, it is preferable that quantization processing to the detection image is terminated when the number of bit data which is not excluded from the detection image reaches a predetermined calculable number, and the correlation calculation is performed.

In an aspect of the present invention, it is preferable that the calculable number is set within a range so as to be 1.1 to 3.0 times the theoretical minimum number necessary for the correlation calculation.

In an aspect of the present invention, it is preferable that dirt of the scale is notified to a user when the number of bit data which is not excluded from the detection image does not reach the predetermined calculable number.

BRIEF DESCRIPTION OF THE DRAWINGS

FIGS. 2A to 2D are diagrams schematically illustrating an example of signal processing when a scale is used as a scale of a reflective photoelectric encoder;

FIGS. 4A to 4E are diagrams schematically illustrating an example of signal processing when a scale is used as a scale of a transmissive photoelectric encoder;

FIG. 7 is a diagram illustrating a configuration of a reflective photoelectric encoder;

FIG. 13 is a diagram illustrating an example of a configuration of a transmissive photoelectric encoder;

FIGS. 14A to 14E are diagrams explaining dirt determination;

FIGS. 16A to 16D are diagrams explaining a modified example;

DETAILED DESCRIPTION

Figure 1:
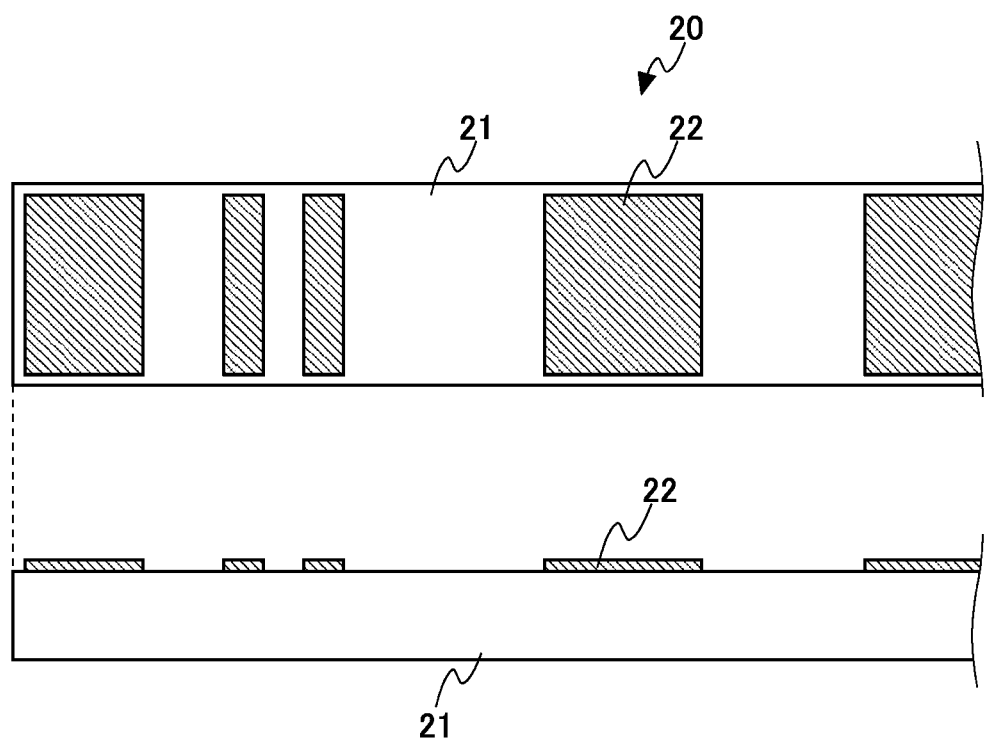
FIG. 1 is a diagram illustrating an example of a scale formed by arranging a predetermined patterned chromium film on a glass substrate.
Figure 3A:
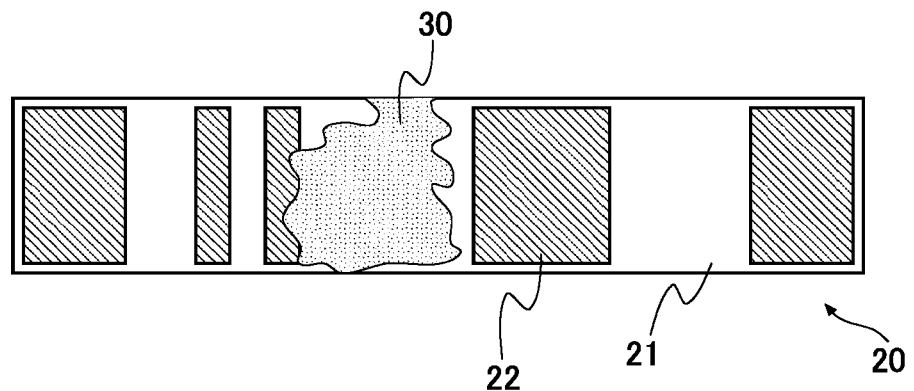
FIGS. 3A and 3B are diagrams illustrating an example of dirt adhering to a part of a scale.
Figure 3B:
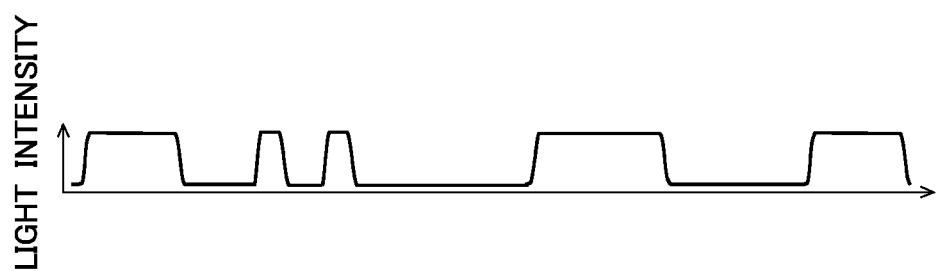
Figure 5A:
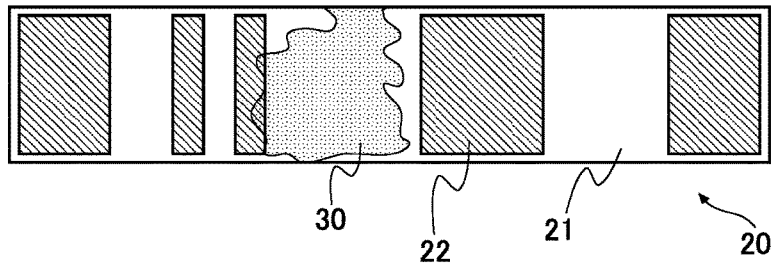
FIGS. 5A to 5E are diagrams schematically illustrating an example of signal processing when a scale to which dirt adheres is used as a scale of a transmissive photoelectric encoder.
Figure 5B:
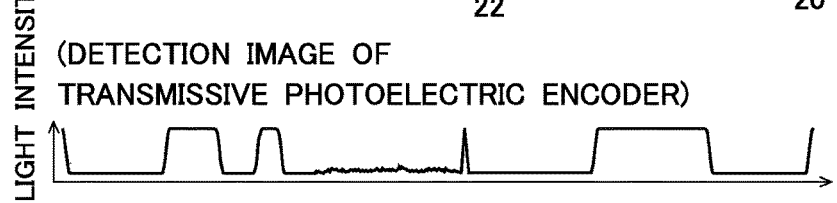
Figure 5C:
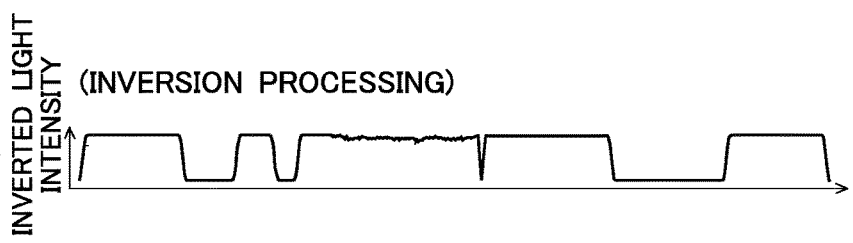
Figure 5D:
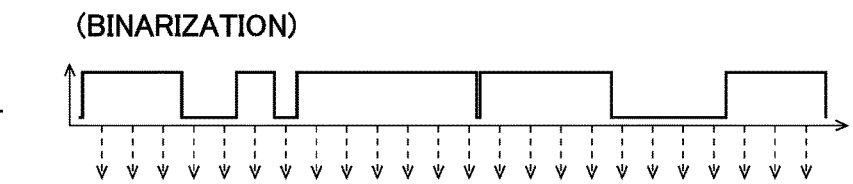
Figure 5E:
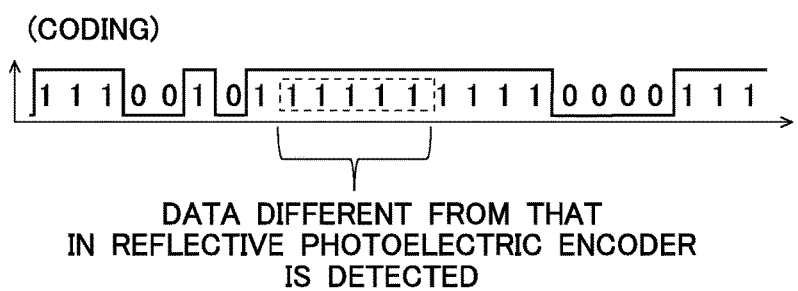
Figure 6A:
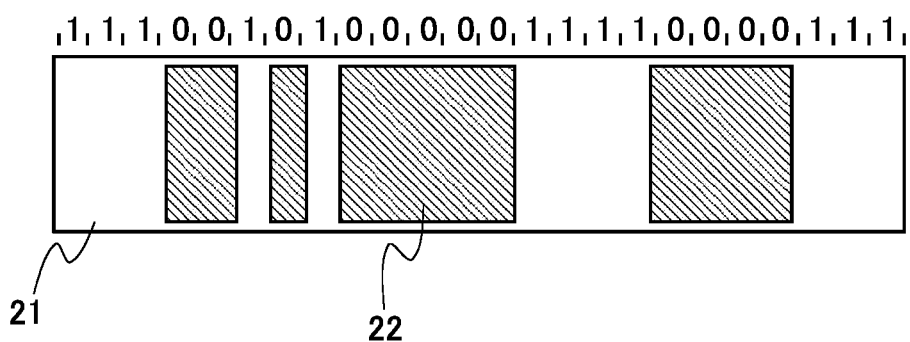
FIGS. 6A and 6B are diagrams illustrating an example of a scale of a transmissive photoelectric encoder to be used when an electrical circuit is commonly used in a reflective photoelectric encoder and a transmissive photoelectric encoder.
Figure 6B:
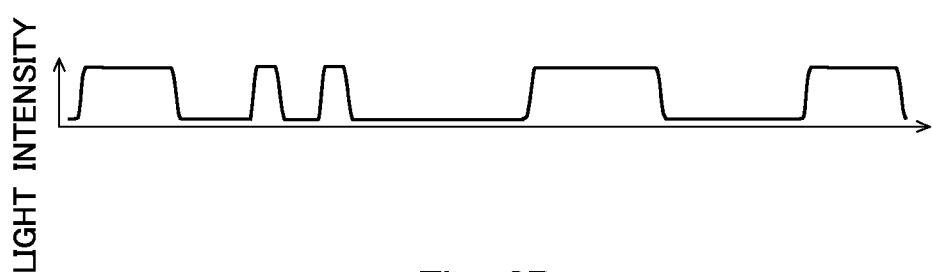

One of the reasons that major parts cannot be commonly used in a transmissive photoelectric encoder and a reflective photoelectric encoder is because that the robustness to dirt is not high.

If there are a scale pattern and a position detection calculation algorithm which have theoretically extremely high robustness to dirt, it can be possible to have totally equivalent performance in the transmissive photoelectric encoder or in the reflective photoelectric encoder.

The inventors have developed a scale pattern and a position detection calculation algorithm which have theoretically extremely high robustness to dirt because of their earnest studies. As a result, the parts can be commonly used in the transmissive photoelectric encoder and the reflective photoelectric encoder for the first time.

Hereinafter, it is described specifically.

First Exemplary Embodiment

As illustrated in FIG. 7, an absolute type photoelectric encoder 100 includes an ABS scale 200 and a detection head part 300 provided so as to be relatively movable along the ABS scale 200 in a length measurement direction.

Here, a reflective type encoder is exemplified.

The detection head part 300 includes a light source 310, a lens 320, a light receiving part 330, a signal processing unit 400, and a setting selector switch 411.

The light source 310 emits light toward the ABS scale 200. The light is reflected by a reflecting part of the ABS scale 200, and transmitted through a transmitting part. Then, the reflected light enters a light receiving surface of the light receiving part 330 through the lens 320.

Figure 8:
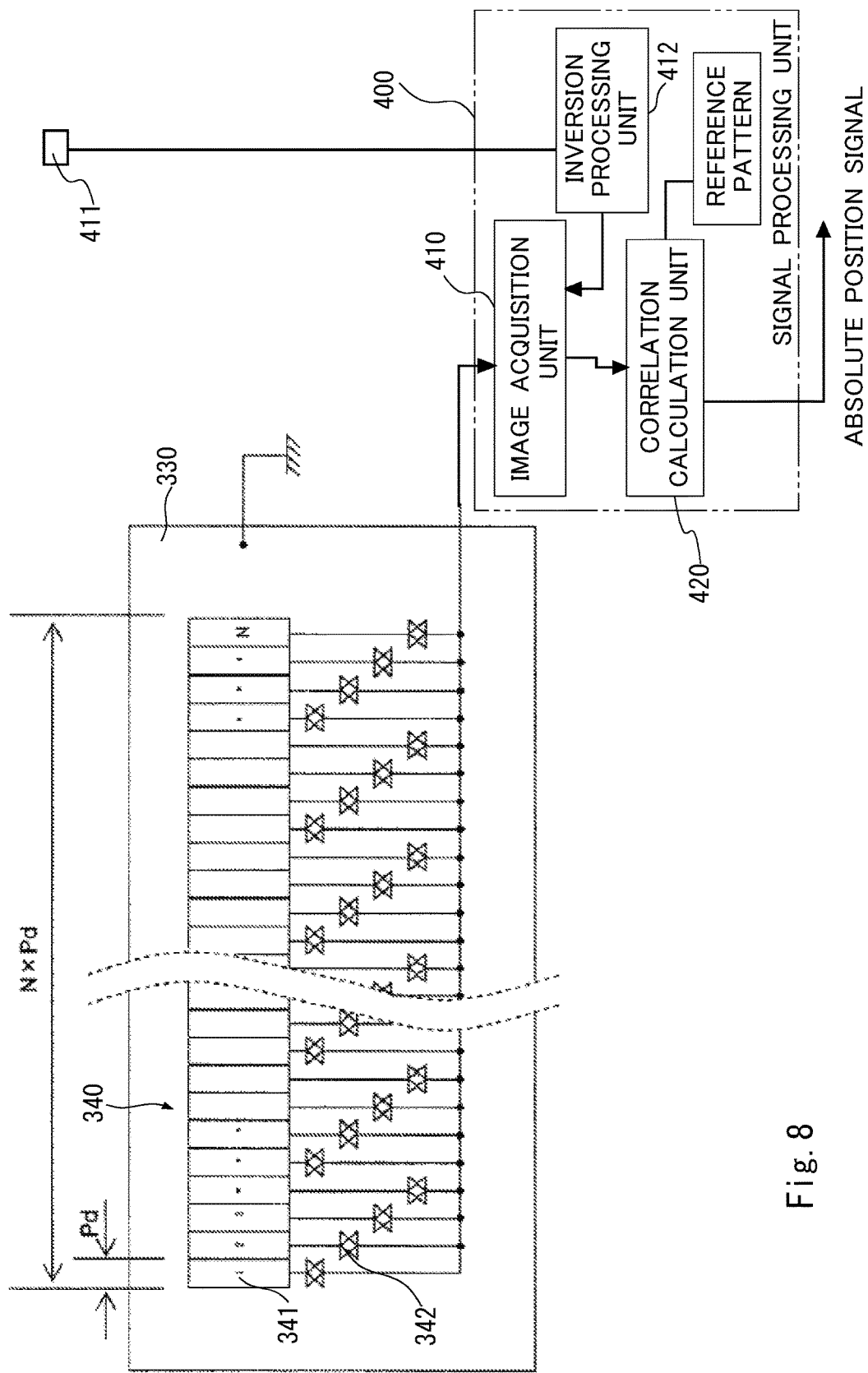
FIG. 8 is a diagram illustrating a light receiving surface of a light receiving part.

FIG. 8 illustrates the light receiving surface of the light receiving part 330.

A bright/dark image pattern is formed on the light receiving surface of the light receiving part 330 according to an ABS scale pattern.

A photodiode array 340 is provided on the light receiving surface of the light receiving part 330.

The photodiode array 340 is formed by arranging photodiodes 341 at a pitch with which a pitch of the ABS scale pattern can be detected. Each of the photodiodes 341 constituting the photodiode array 340 includes a switch 342, and is connected with the signal processing unit 400 through the switch 342. By sequentially turning the switch 342 ON, a light receiving signal from each of the photodiodes 341 is swept.

The signal processing unit 400 includes an image acquiring unit 410 and a correlation calculation unit 420. The image acquiring unit 410 sequentially sweeps a signal from the photodiode array 340 of the light receiving part 330, and acquires a detection image of the ABS scale 200.

Here, an inversion processing unit 412 is attached to the image acquiring unit 410 in the present exemplary embodiment.

The inversion processing unit 412 performs inversion processing to positive/negative (or H/L) of the detection image as required.

It is assumed that the ABS scale 200 is used as a reflective type scale in the example described here, and that the inversion processing unit 412 is set to OFF at this time and is not used. When the same ABS scale 200 is used as a transmissive type scale of a transmissive photoelectric encoder, the inversion processing unit 412 is set to ON.

In this case, the inversion processing unit 412 inverts the detection image acquired by the image acquiring unit 410. Since the setting selector switch 411 is connected with the inversion processing unit 412, the ON/OFF setting of the inversion processing unit 412 can be changed by the setting selector switch 411 in the middle of assembling or before shipping.

The correlation calculation unit 420 stores design data of the ABS scale pattern as a reference pattern beforehand.

The correlation calculation unit 420 performs correlation calculation between a signal pattern acquired at the light receiving part 330 and the reference pattern, and calculates the position from the peak of the correlation.

As the ABS scale pattern, there is a pattern using, for example, an M-sequence code which is one of pseudo random code sequences. When N number of continuous codes in the M-sequence code pattern are extracted from an M-sequence code pattern generating polynomial constituted by N stages of shift registers, the pattern formed by the N number of codes appears once in a period of the M-sequence code pattern. Thus, the absolute position on the ABS scale pattern can be acquired from the peak of the correlation between the signal pattern acquired at the light receiving part 330 and the reference pattern.

The ABS scale 200 is described below.

Specifically, the ABS scale pattern is described.

Figure 9:
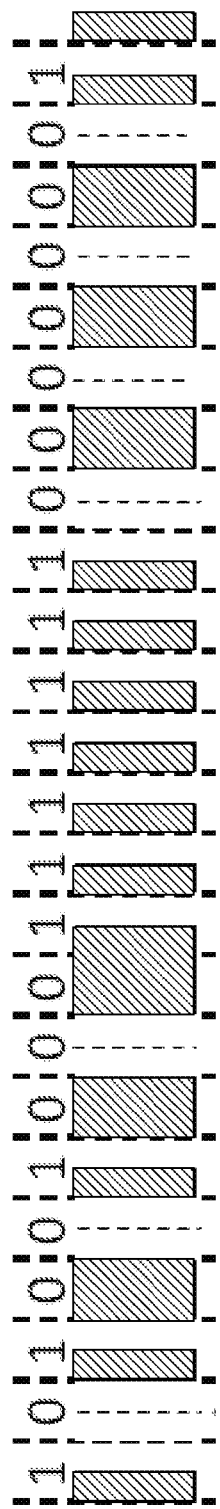
FIG. 9 is a diagram illustrating an example of an ABS scale pattern generated with a method of an embodiment of the present invention.

FIG. 9 illustrates an example of the ABS scale pattern. In the ABS scale pattern, each code of "1" and "0" is represented by two bits.

In other words, when the width of a bit is d, the code width of an M-sequence code pattern is 2×d.

Figure 10:
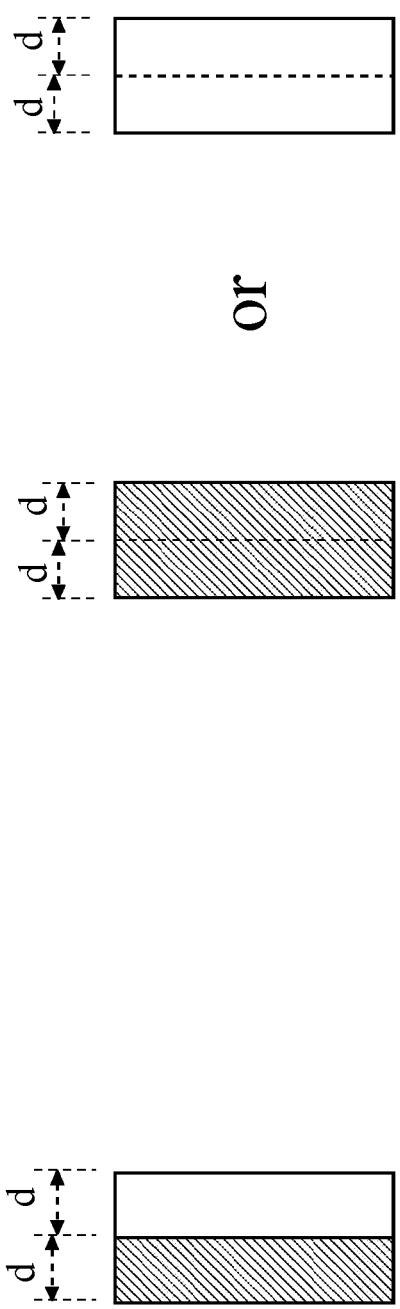
FIG. 10 is a diagram illustrating a bit pattern representing a code.

However, three bit-combination patterns exemplified in FIG. 10 are used to represent the two codes of "1" and "0".

The code "1" is a combination of a dark part and a bright part. This combination of (dark and bright) is referred to as a A pattern.

Note that, the light transmitting part is referred to as a dark part (or "L"), and the light reflecting part is referred to as a bright part (or "H") based on the assumption of a reflective photoelectric encoder. Naturally, if the same scale is used in a transmissive photoelectric encoder, this relationship is inverted.

The representation of the code "0" is described.

As illustrated in FIG. 10, two patterns are prepared to represent the code "0".

The code "0" is represented by a B pattern in which the two bits are the dark parts, and by a C pattern in which the two bits are the bright parts.

The B pattern is a combination of (dark and dark), and the C pattern is a combination of (bright and bright).

In this manner, the same code "0" is represented by using the two patterns.

Next, a design rule to determine which one of the B pattern or the C pattern is arranged to represent the code "0" is described with reference to the example of FIG. 11.

In short, to represent the code "0", the B pattern and the C pattern are to be alternately arranged by referring to the immediately previous code "0" (here, on the left side).

Figure 11:
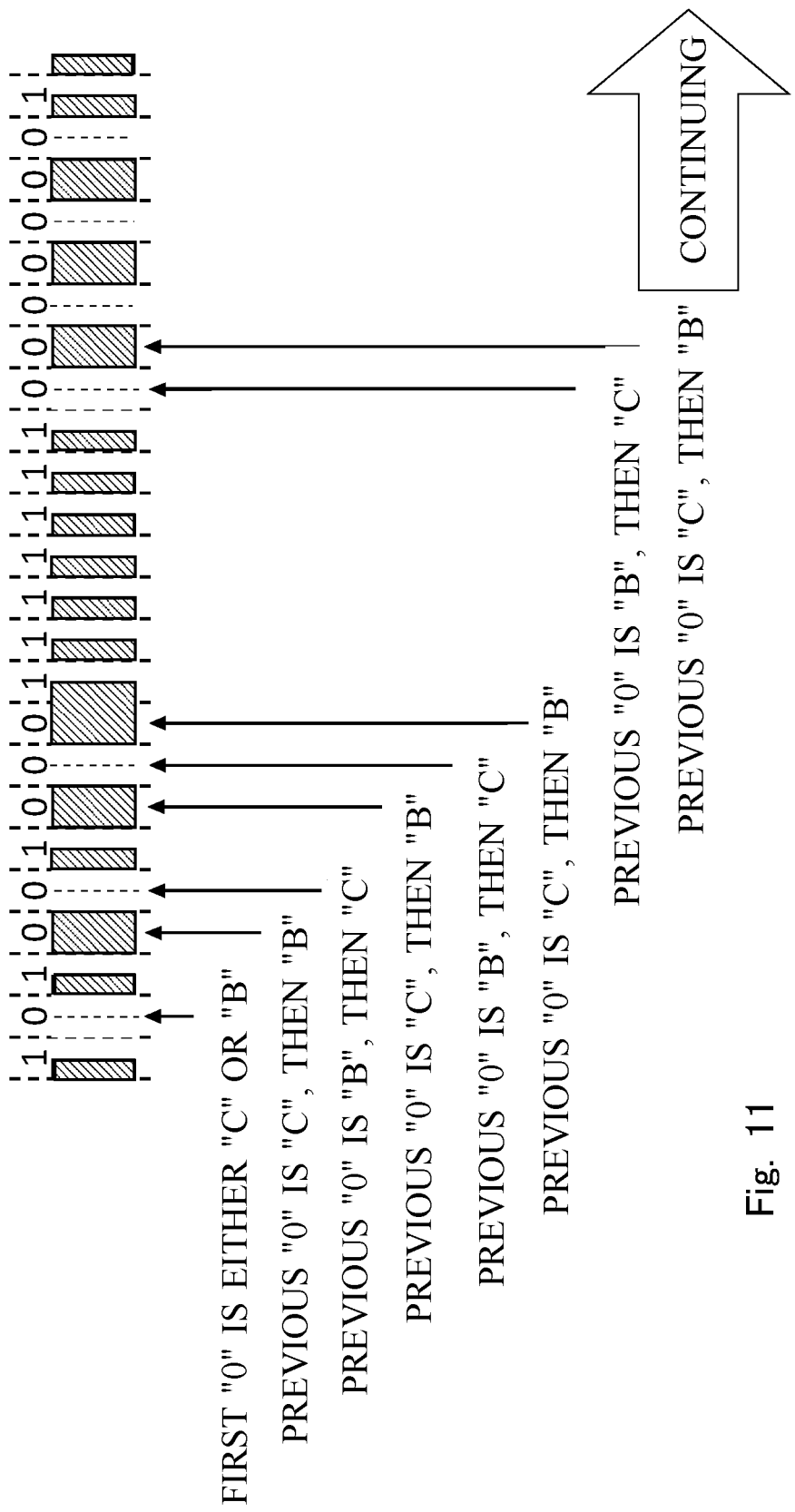
FIG. 11 is a diagram explaining an arrangement rule of a B pattern and a C pattern which represent "0"

In the example of FIG. 11, the leftmost code "0" can be either of the two patterns, and is assumed to be the C pattern here. The right of this code "0" is the code "1", and the A pattern is arranged.

The code "0" on the right of this code "1" is described.

By referring to the left side of this code "0", the immediately previous code "0" is the C pattern. Thus, the B pattern is used for this code "0". Furthermore, to represent the code "0" on the right of this code "0", the C pattern different from the previous B pattern is used.

In this manner, to represent a code "0", by using a pattern different from that used for the immediately previous code "0" on the left side, the number of the continuous dark parts or the continuous bright parts is three bits at the maximum.

In other words, when the number of continuous bright parts or the number of continuous dark parts is four or more bits in the signal pattern detected at the light receiving part 330, the upper limit value is exceeded, that is, the pattern deviates from the design rule, and it can be determined that the pattern is affected by some kind of dirt.

With reference to an example of FIGS. 12A to 12D, dirt determination is described.

Figure 12A:
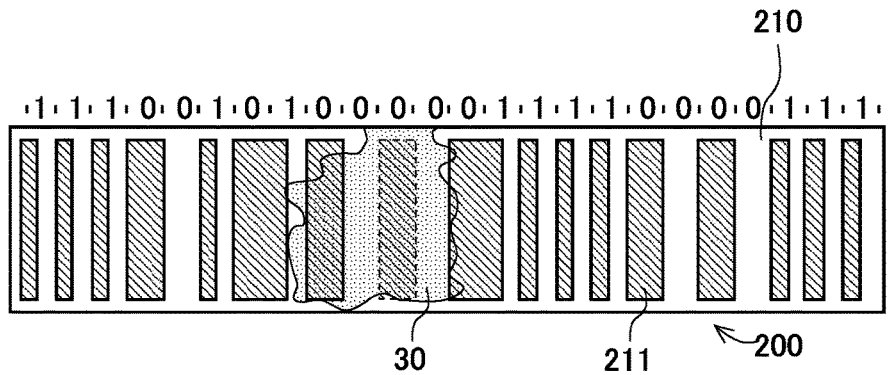
FIGS. 12A to 12D are diagrams explaining dirt determination.

As illustrated in FIG. 12A, the dirt 30 adheres to a code "0".

If all the codes "0" are represented by the dark parts (non-reflecting parts), it cannot be determined from the signal pattern whether the pattern is "0" or the dirt 30. In this example, the signal pattern does not change in the end in the conventional technique using the dark part alone to represent a code "0", but the result is merely a coincidence.

In contrast, the number of continuous dark parts is to be less than four bits, that is, the upper limit value is not to be exceeded in the ABS scale according to the present embodiment. Thus, it is possible to be determined that the pattern in which the number of continuous dark parts is four or more bits is dirt.

Figure 12B:
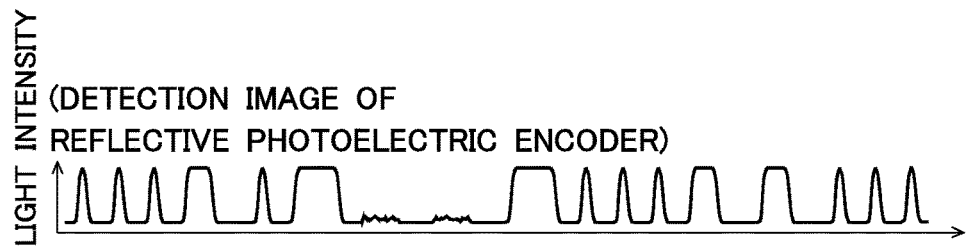
Figure 12C:
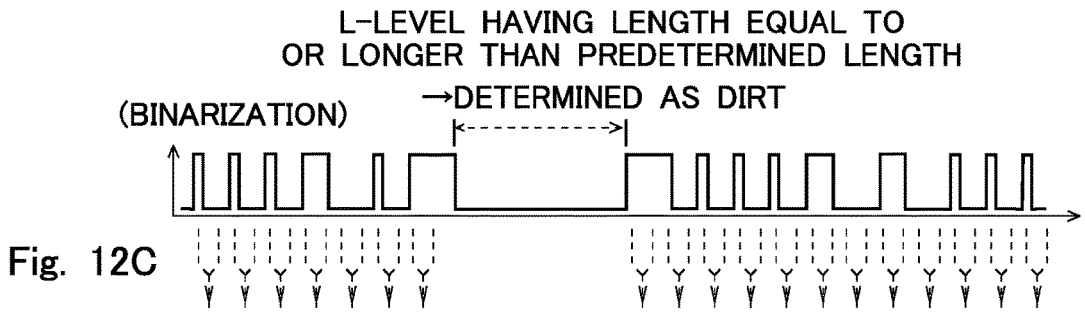

When the detection image acquired by the image acquiring unit 410 (FIG. 12B) is binarized, a bit string of bright parts (H)/dark parts (L) is obtained as illustrated in FIG. 12C.

Here, if the number of continuous bright parts (H) or the number of continuous dark parts (L) is four or more bits, the pattern deviates from the design rule, and it is determined that the pattern is not a correct signal, but is, for example, the dirt 30. Then, it is determined that the pattern in which the number of continuous dark parts (L) is four or more bits is the dirt 30, and the pattern is not to be used for the correlation calculation.

Thus, the correlation calculation is performed with the signal acquired correctly, and it is possible to prevent a wrong correlation peak from appearing due to the wrong correlation calculation. By preventing dirt from affecting the correlation calculation in this manner, it is possible to improve the robustness to dirt.

Note that, it has been assumed that the dirt becomes the non-reflecting parts in the above description, but the same effect can be obtained when the dirt reflects light in the present embodiment. In other words, in accordance with the design rule of the present embodiment, the number of continuous bright parts is to be less than four bits, and if the number of continuous bright parts is four or more bits, it is determined that the pattern is affected by dirt.

By using the ABS scale of the present embodiment in this manner, it is possible to prevent incorrect data due to dirt from being used for the correlation calculation. Thus, the accuracy (reliability) of the position detection is improved.

Furthermore, when the ABS scale 200 of the present exemplary embodiment is used in either the reflective type or the transmissive type, the robustness to dirt can be maintained nearly equally.

FIG. 13 is a diagram illustrating an example of a configuration of a transmissive photoelectric encoder 100T. The parts common to the reflective photoelectric encoder 100 (FIGS. 7 and 8) are used except that the light source 310 is moved to the opposite side of the ABS scale 200.

Note that, although the configuration of the signal processing unit 400 is the same as that of the reflective photoelectric encoder 100 (FIG. 8), the inversion processing unit 412 is set to ON by the setting selector switch 411 when the signal processing unit 400 is used in the transmissive photoelectric encoder 100T.

As illustrated in FIG. 14A, the dirt 30 adheres to a code "0" similarly to FIG. 12A.

The ABS scale 200 is irradiated with light, and the light transmitted through the ABS scale 200 is received at the light receiving part 330. Then, a chromium film 211 becomes a non-transmitting part, and a glass part 210 becomes a light transmitting part, and thus, a bright/dark pattern of FIG. 14B is obtained.

The bright parts and the dark parts in the pattern are inverted except the dirt 30 compared with those in the reflective type (FIG. 12B). Thus, the inversion processing unit 412 inverts the pattern (FIG. 12C) to commonly perform the correlation calculation. When the pattern is binarized, the part equivalent to the dirt 30 wrongly becomes the bright parts (H) as illustrated in FIG. 14D.

Here, if the number of continuous bright parts (H) or the number of continuous dark parts (L) is four or more bits, the pattern deviates from the design rule, and it is determined that the pattern is not a correct signal, but is, for example, the dirt 30. Then, it is determined that the pattern in which the number of continuous dark parts (H) is four or more bits is the dirt 30, and the pattern is not to be used for the correlation calculation.

The correlation calculation is performed with the signal acquired correctly to prevent a wrong correlation peak from appearing due to the wrong correlation calculation. Consequently, the robustness to dirt is improved.

Figure 12D:
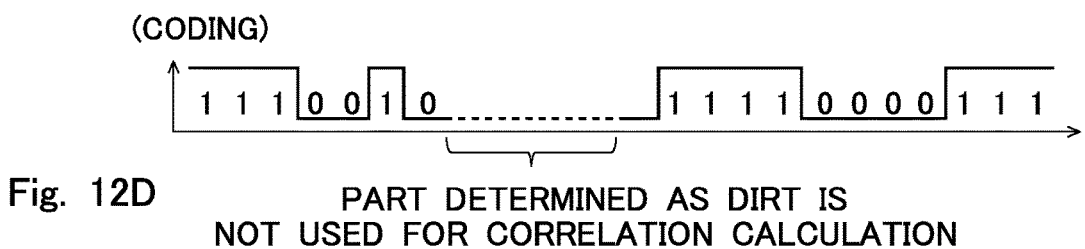

Then, by comparing FIG. 12D with FIG. 14E, if the ABS scale 200 is used as the scale of the reflective photoelectric encoder 100 or as the scale of the transmissive photoelectric encoder 100T, the influence of the dirt can be eliminated equally.

From the above point, if the ABS scale 200 of the present exemplary embodiment is used in either the reflective type or the transmissive type, it is possible to equally maintain the robustness at a high level. When the inversion processing unit 412 is incorporated in the signal processing unit 400 and used in the transmissive type, the inversion processing unit 412 is set to ON at a product shipping stage.

Furthermore, by alternately arranging the B pattern and the C pattern which represent the code "0" in the present embodiment, the appearance frequency of the bright part is substantially equal to that of the dark part.

This facilitates the setting of a threshold from the received-light intensity to perform quantization, and it is possible to reduce the load on the signal processing unit 400 or to simplify the signal processing unit 400.

Moreover, when the ABS scale 200 is used in the transmissive type or in the reflective type, the amount of light received by the light receiving part 330 is substantially the same, and which shows that the signal processing unit 400 is suitable to be used commonly.

Modified Example 1

A modified example 1 is described below.

Figure 15A:
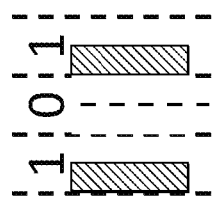
FIGS. 15A to 15C are diagrams explaining a modified example.
Figure 15B:
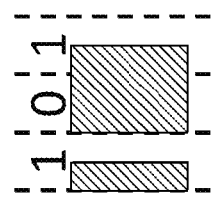
Figure 15C:
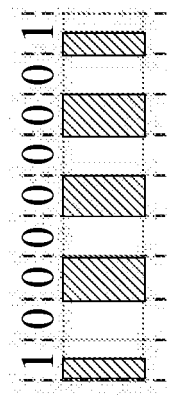

FIGS. 15A to 15C are diagrams explaining the modified example 1. In the above described embodiment, the B pattern and the C pattern which represent "0" are necessarily alternately arranged. In the modified example 1, the flexibility when the B pattern or the C pattern is selected may be enhanced as long as the number of continuous dark parts or the number of continuous bright parts is less than four bits.

For example, as illustrated in FIGS. 15A, and 15B, when a code "0" is separately isolated, that is, when both sides of the code "0" are the codes "1", either of the B pattern or the C pattern may be used to represent the code "0".

In either case, the number of continuous bright parts or the number of continuous dark parts is less than four bits. However, as illustrated in FIG. 15C, when two or more codes "0" are continued, the B pattern and the C pattern need to be alternate. As long as at least the design rule is followed, the number of continuous bright parts or the number of continuous dark parts is to be less than four bits.

Modified Example 2

A modified example 2 is described below.

A feature of the modified example 2 is to use three patterns to represent the two codes of "1" and "0". Thus, for example, the patterns may be the patterns as illustrated in FIG. 16A.

In FIG. 16A, two patterns are used to represent the code "0"; both two bits are the dark parts (the B pattern), and both two bits are halftone parts.

The pattern in which both two bits are the halftone parts is referred to as a D pattern. In other words, the B pattern and the D pattern are alternately used to represent the code "0".

The bright part and the dark part are referred to as "H" and as "L" respectively, and the halftone part (an intermediate part) is referred to as "M".

The dark part is marked by hatching in the other diagrams, but the dark part is marked by solid black in FIGS. 16A to 16D to make the difference from the halftone comprehensible.

Alternatively, the patterns may be the patterns illustrated in FIG. 16B. In other words, the halftone parts constituted by the two bits are not implemented by a layer having reflectivity (transmissivity) of about 50%, but may be implemented by forming the upper half parts and the lower half parts with the dark parts and the bright parts respectively.

The patterns illustrated in FIGS. 16A and 16B may be further modified as the patterns illustrated in FIGS. 16C and 16D.

To represent the code "1", the order of the pattern is not the dark part and the bright part, but may be the bright part and the dark part.

This pattern is referred to as an A' pattern. Furthermore, to represent the code "0", the C pattern may be used instead of the B pattern.

Note that, in the above description, it is needless to say that the code "1" and the code "0" are replacable with each other.

Second Exemplary Embodiment

Next, a second exemplary embodiment of the present invention is described below.

As the second exemplary embodiment, a signal processing operation using dirt determination is described.

Figure 17:
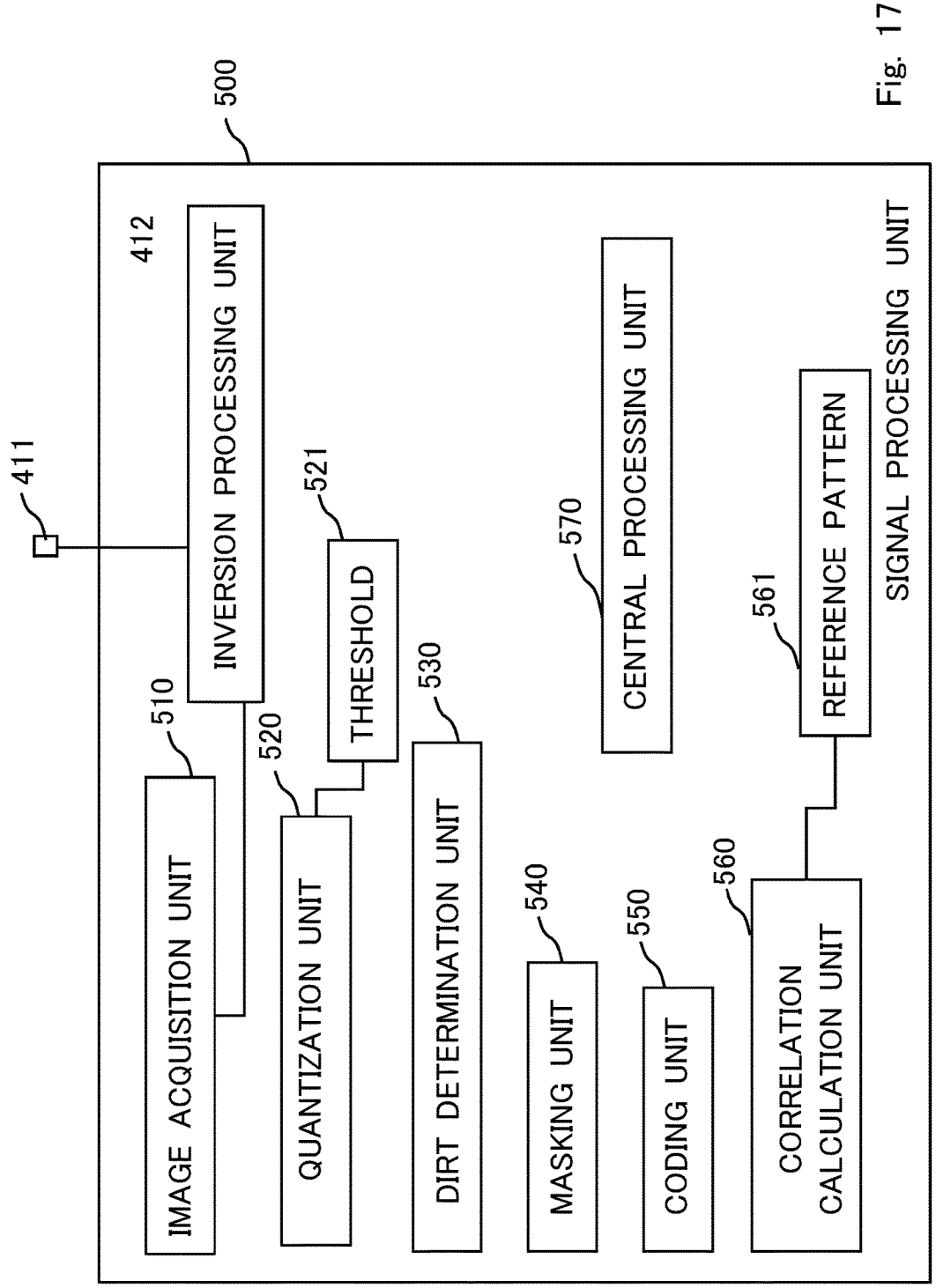
FIG. 17 is a functional block diagram of a signal processing unit.

FIG. 17 is a functional block diagram of a signal processing unit 500 in the second exemplary embodiment.

The signal processing unit 500 includes an image acquiring unit 510, a quantization unit 520, a dirt determination unit 530, a masking unit 540, a coding unit 550, a correlation calculation unit 560, and a central processing unit 570.

Furthermore, an inversion processing unit 412 is attached to the image acquiring unit 510.

The inversion processing unit 412 is set to ON when used as a transmissive photoelectric encoder as described in the first exemplary embodiment.

In the second exemplary embodiment, it is assumed that the inversion processing unit 412 is set to OFF based on the assumption of the case of a reflective photoelectric encoder.

However, whether the inversion processing is performed is not directly related with the algorithm of the dirt determination, and the algorithm of the second exemplary embodiment can be similarly applied regardless of the inversion processing.

Thus, it is possible to commonly use the signal processing unit 500 implementing the second exemplary embodiment in either the reflective photoelectric encoder or the transmissive photoelectric encoder.

The signal processing unit 500 is mainly constituted by a CPU, a ROM, and a RAM, and operates as the functional units by loading calculation programs.

The operations of the functional units are described with reference to the flowchart in FIG. 18.

Figure 18:
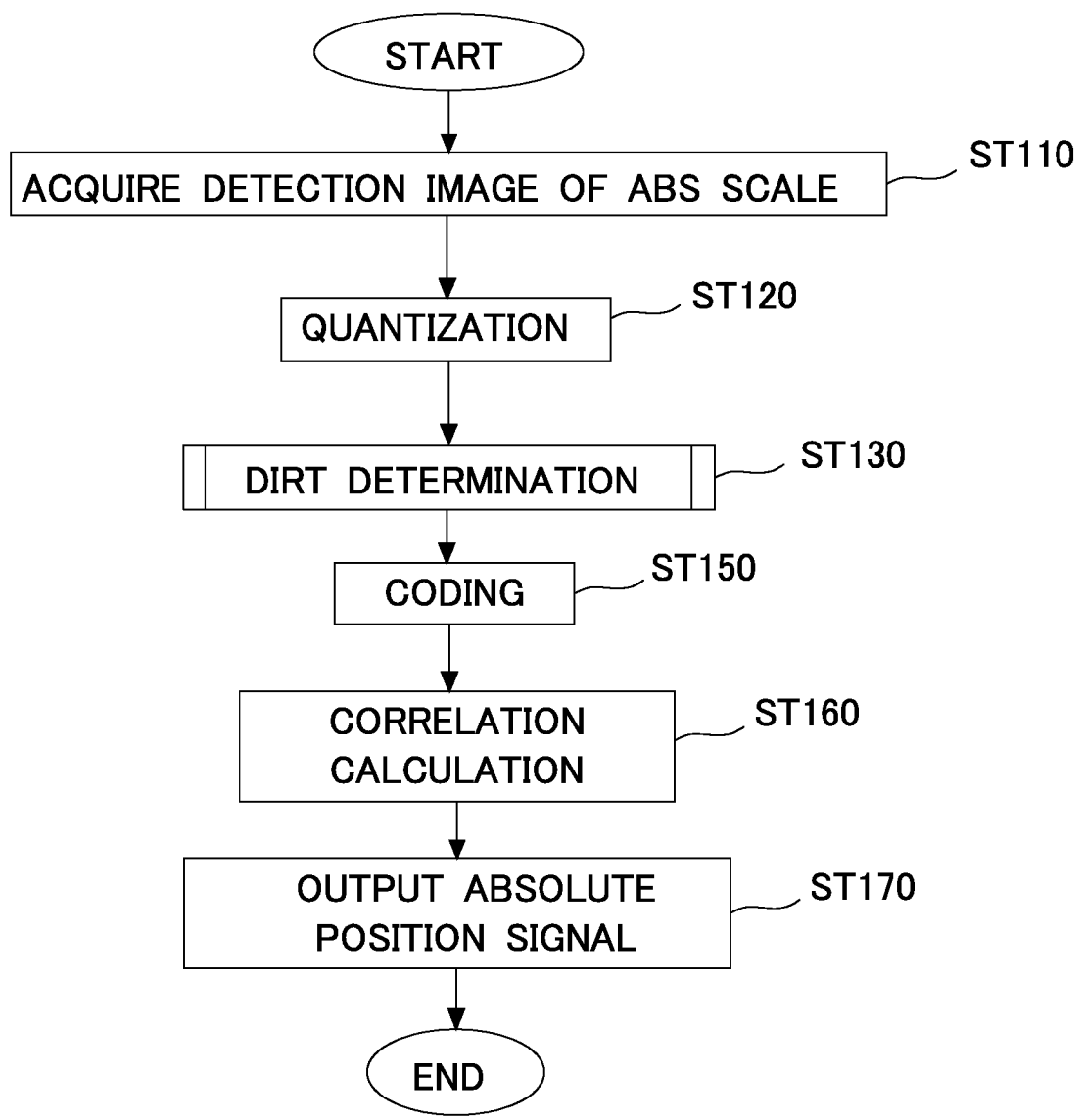
FIG. 18 is a flowchart explaining an operation procedure of a signal processing unit.

FIG. 18 is the flowchart explaining an operation procedure of the signal processing unit 500.

First, the image acquisition unit 510 sequentially sweeps signals from a photodiode array 340 of a light receiving part 330, and acquires the detection images of an ABS scale 200 (ST110). Then, the quantization unit 520 sequentially quantizes the acquired detection images (ST120).

Here, it is assumed that an appropriate threshold to the received-light intensity has been set. By comparison with the threshold, the dark part and the bright part are distinguished from each other and binarized.

Here, for the sake of the following description, the dark part is referred to as "L", and the bright part is referred to as "H".

Figure 20:
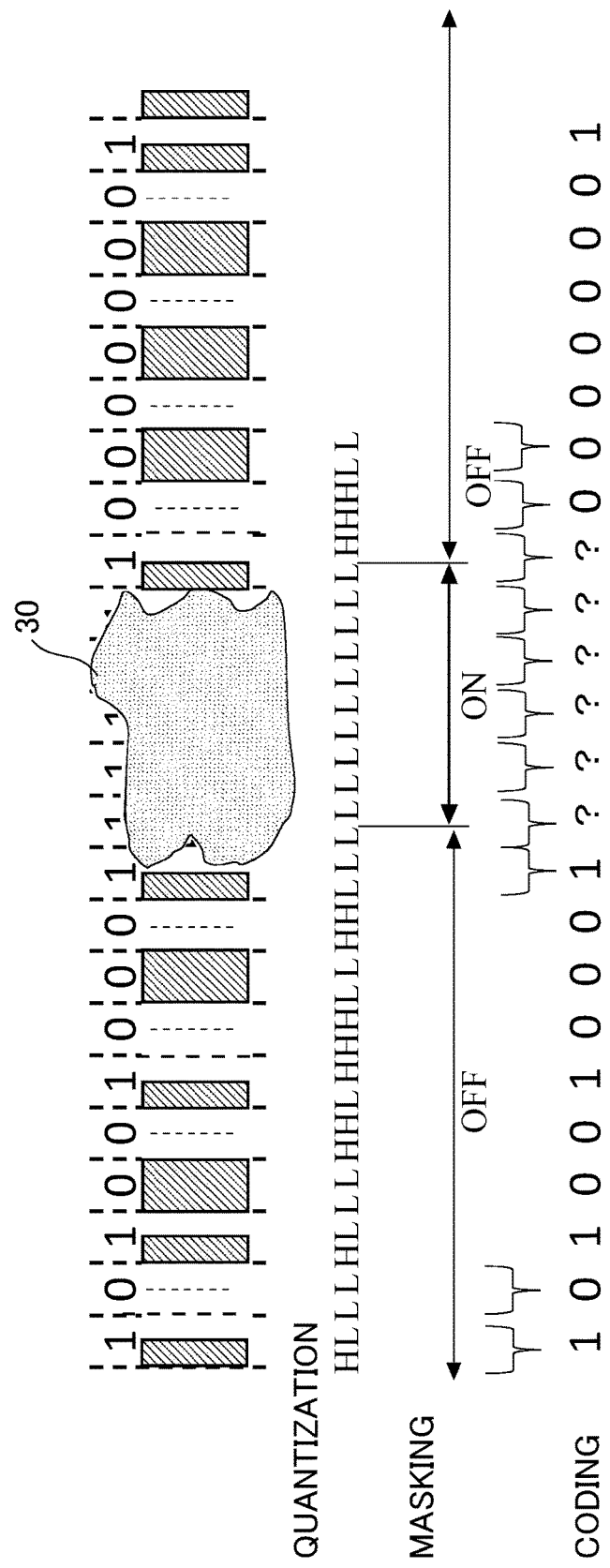
FIG. 20 is a diagram illustrating examples of quantization, masking, and coding.

Then, the image is quantized as illustrated in the second row of FIG. 20. In the example of FIG. 20, the dirt 30 adheres to a part of the ABS scale 200.

When the received-light intensity at a photodiode 341 is lower than the threshold, the quantized value thereof is naturally "L".

Following the quantization (ST120), dirt determination is performed by the dirt determination unit 530 (ST130).

With reference to a flowchart in FIG. 19, dirt determination processing (ST130) is described below.

Figure 19:
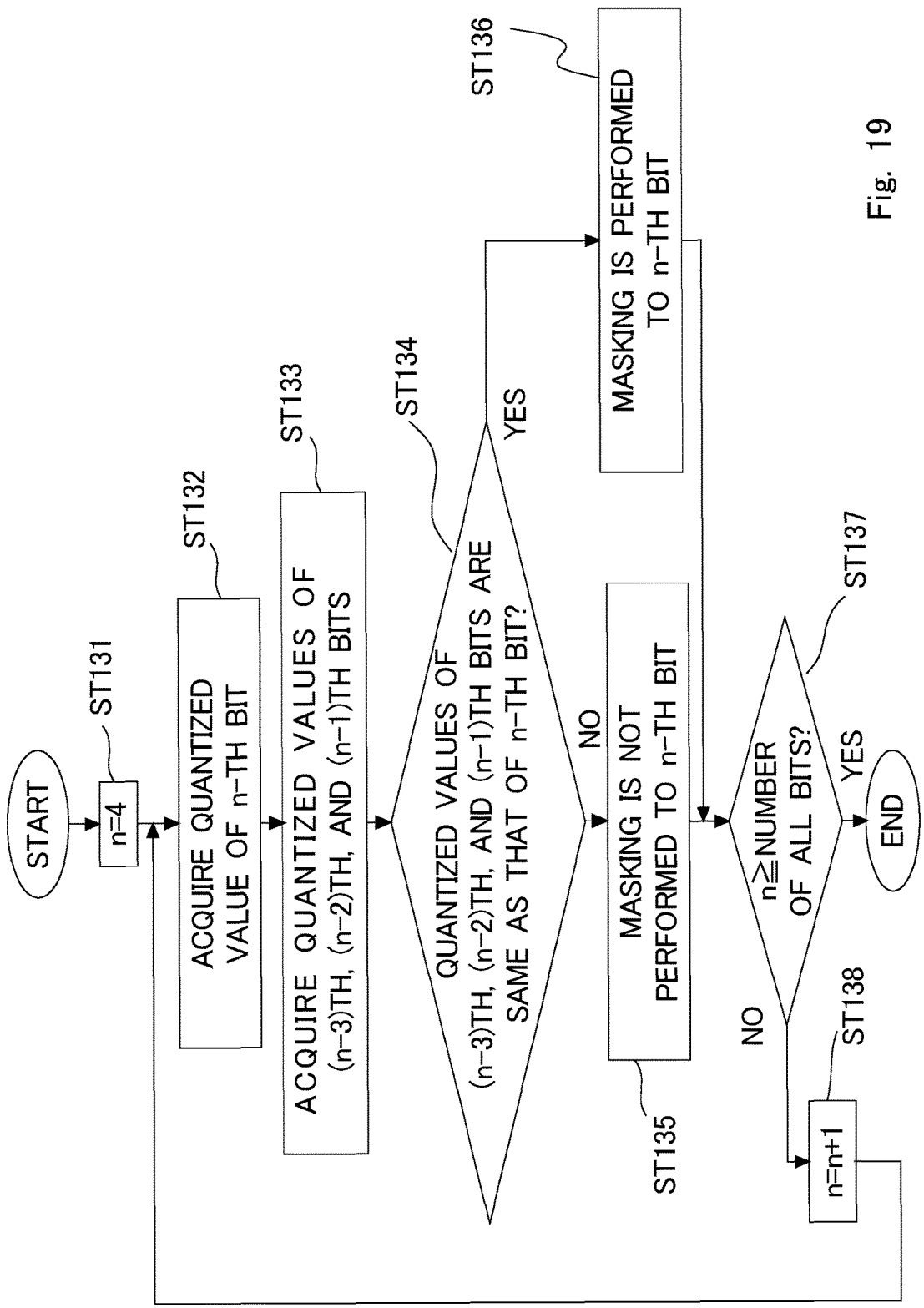
FIG. 19 is a flowchart explaining a dirt determination processing procedure.

FIG. 19 is the flowchart explaining a procedure of the dirt determination processing (ST130). To perform the dirt determination processing (ST130), first, a parameter n is initialized to count bits. The parameter n is initialized to n=4, for the sake of the following processing. Here, it is assumed that the quantized values in FIG. 20 are numbered in order from the left end as 1, 2, 3, . . . .

The dirt determination unit 530 acquires the quantized value of n-th bit (ST132).

Here, it is assumed that n equals four.

The quantized value of the fourth bit is "L".

Next, the dirt determination unit 530 acquires the quantized values of the (n−3)th, the (n−2)th, and the (n−1)th bits, that is, the quantized values of the continuous four bits (ST133). Here, n equals four, and the dirt determination unit 530 acquires the quantized values of the first bit, the second bit, and the third bit (ST133).

Then, the dirt determination unit 530 determines whether the quantized values of the continuous four bits are the same.

In the design rule of the ABS scale pattern, the upper limit number of continuous quantized values having the same value is three bits, and the number of continuous quantized values having the same value (L or H) is less than four bits. Thus, the n-th bit to be determined is compared to the quantized values of the immediately previous three bits.

When all the quantized values are not the same (ST134: NO), the pattern is possible at least in the design rule and is reliable, and the quantized value of the n-th bit is not masked (ST135).

On the other hand, when all the quantized values are the same (all H or all L) (ST134: YES), the quantized value of the n-th bit deviates from the design rule and is not reliable, and it is determined that the pattern is affected by dirt.

In this case, the quantized value of the n-th bit is masked so as not to be used (ST136).

The processing in ST132 to ST138 is repeated until the parameter n reaches the number of all bits of the acquired image. When the parameter n reaches the number of all bits of the acquired image, the dirt determination is terminated (ST137: YES).

The third row of FIG. 20 illustrates ON/OFF of the masking.

When the dirt determination is terminated (ST130), then, coding is performed by the coding unit 550 (ST150).

To perform the coding, the quantized value of an unmasked bit is used.

One code is represented by two bits.

A combination of (L, H) is converted into a code "1".

Combinations of (L, L) and (H, H) are converted into a code "0".

The fourth row of FIG. 20 illustrates an example of a coded result.

By the masking (ST136), quantized values are unknown in some parts. Naturally, the codes are unknown in the part of the masked bits. In FIG. 20, the unknown values are represented by "?".

The correlation calculation between the coded data and the reference pattern is performed in this manner (ST160).

The position indicating the highest correlation in the correlation calculation is calculated as the current absolute position (ST170).

By performing the processing in the second exemplary embodiment, it is possible to distinguish the unreliable code due to dirt.

Furthermore, it is possible not to use the unreliable code for the correlation calculation. Thus, the accuracy (reliability) of the position detection is improved.

This can be similarly applied to the ABS scale used as the reflective type or as the transmissive type, and thus, it is possible to commonly use the parts in the reflective photoelectric encoder and in the transmissive photoelectric encoder.

Third Exemplary Embodiment

With reference to flowcharts in FIGS. 21 to 23, a third exemplary embodiment of the present invention is described below.

In the above second exemplary embodiment, it has been described that a reliable quantized value and an unreliable quantized value can be distinguished by the dirt determination (ST130).

Since the reliable quantized value and the unreliable quantized value can be distinguished by the dirt determination (ST130), the quantization processing and the dirt determination processing may be terminated when a predetermined number of reliable quantized values are obtained.

Figure 21:
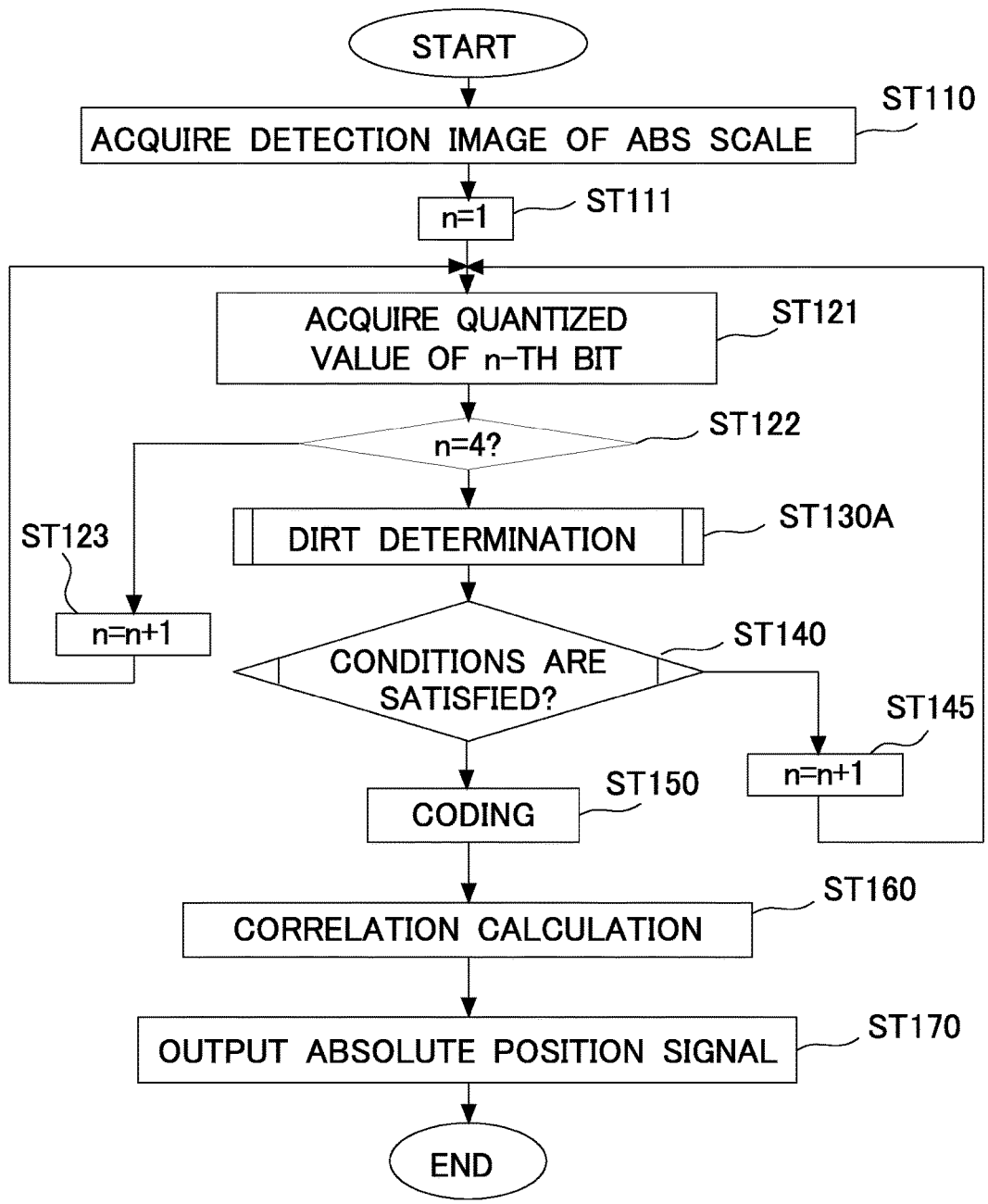
FIG. 21 is a flowchart explaining a third exemplary embodiment.
Figure 22:
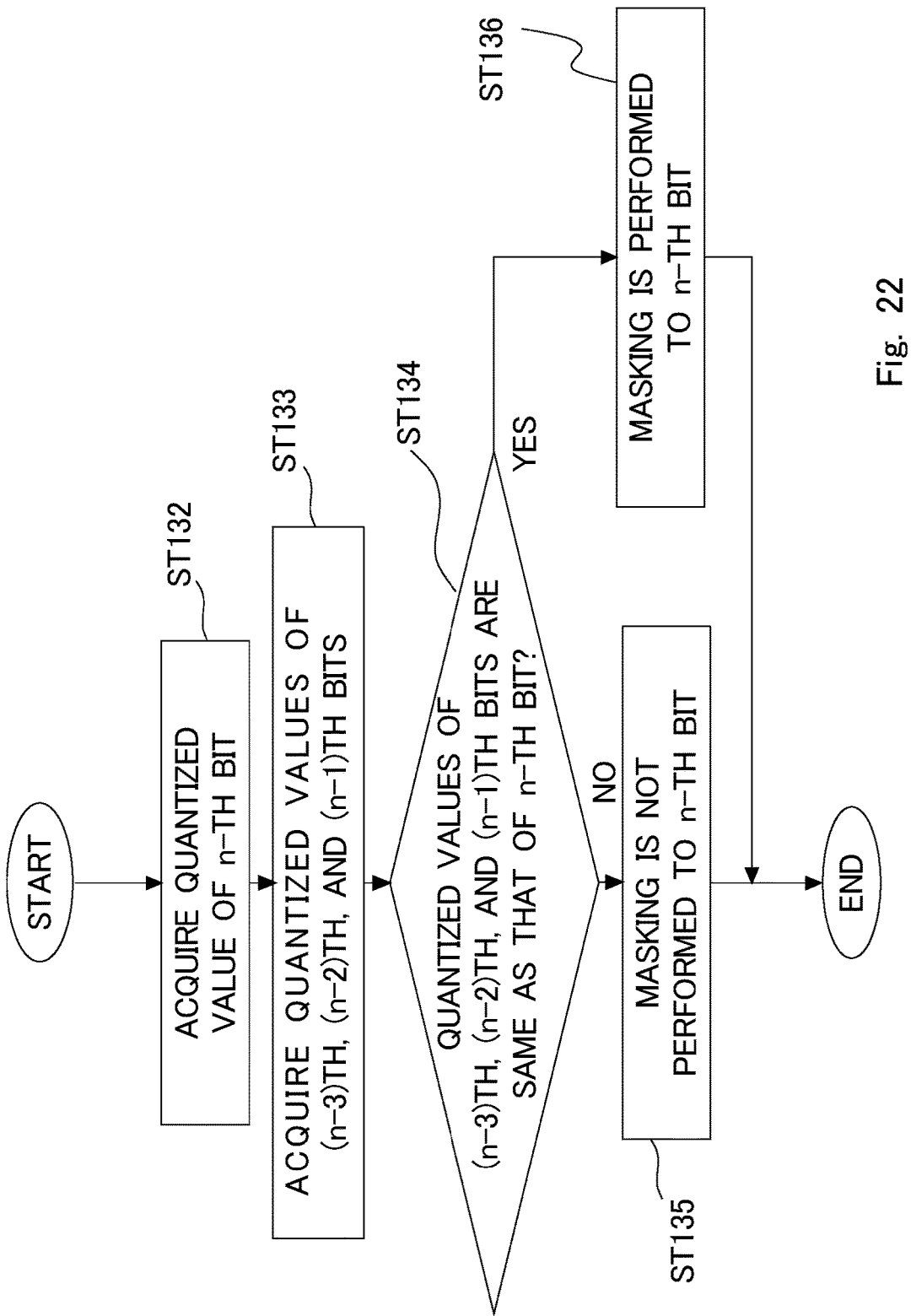
FIG. 22 is a flowchart explaining the third exemplary embodiment.
Figure 23:
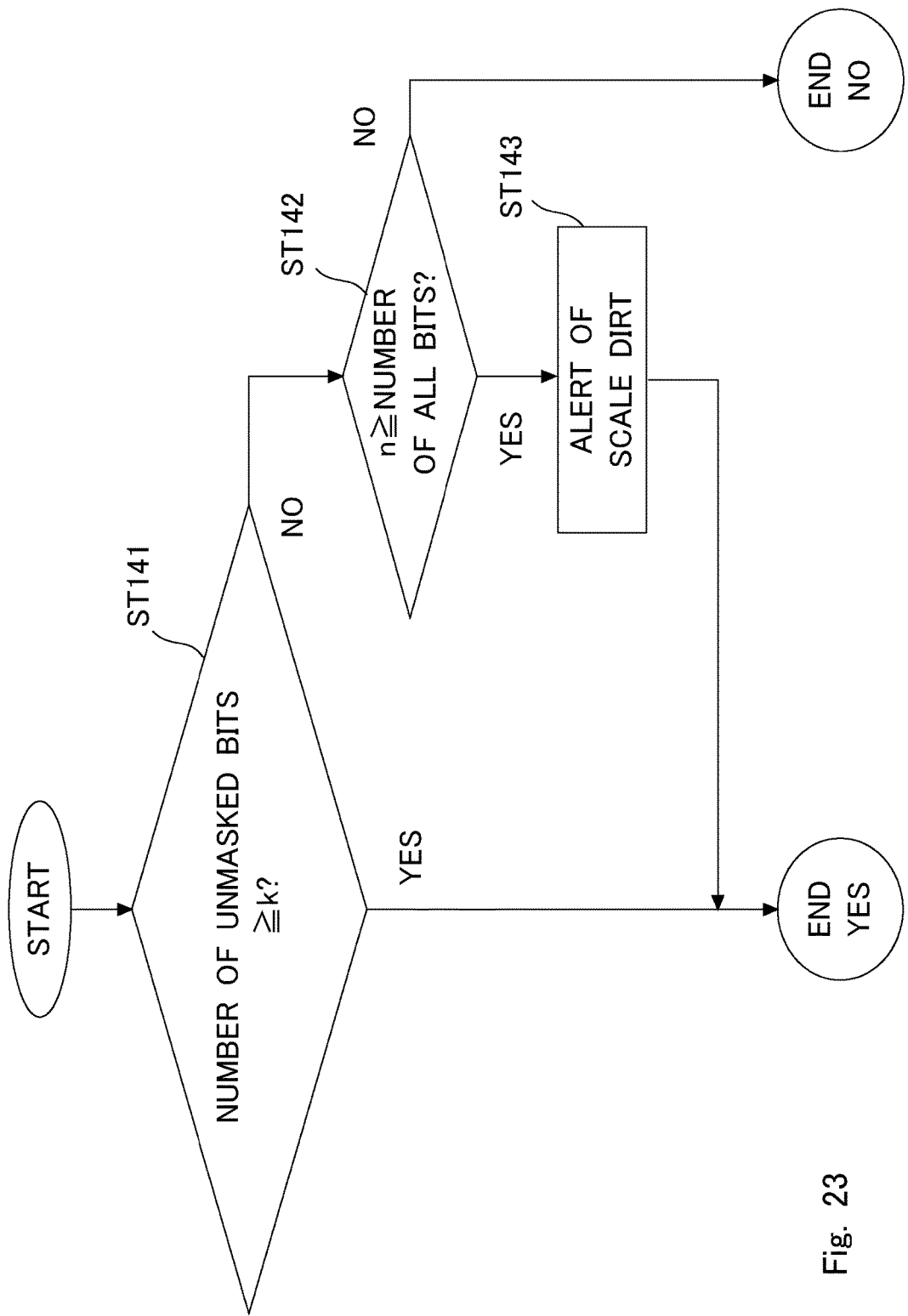
FIG. 23 is a flowchart explaining the third exemplary embodiment.

To avoid overlapped descriptions, the same step numbers are attached to the processing steps, in the flowcharts in FIGS. 21 to 23, common to those in the second exemplary embodiment. The processing is briefly described below in order.

In ST110, a detection image is acquired from a light receiving part 330.

Then, a quantization unit 520 quantizes the detection image. In the present exemplary embodiment, all bits of the detection image are not quantized at once, but the required bits of the detection image are sequentially quantized.

To perform dirt determination (ST130A), first, the quantization is performed from the first bit to the fourth bit (ST111 to ST123). Then, when the quantization is performed to the fourth bit (ST122), the dirt determination is performed to the fourth bit (ST130A).

The procedure of the dirt determination is the same as that in the second exemplary embodiment, but the dirt determination is temporarily terminated when the dirt determination is performed to the target bit (the n-th bit) as illustrated in FIG. 22 again.

Returning back to FIG. 21, following the dirt determination (ST130A), it is determined whether termination conditions are satisfied (ST140).

Termination condition determination (ST140) is shown in the flowchart in FIG. 23.

As the termination conditions, it is determined whether the number of unmasked bits is equal to or more than a predetermined number (here, k) (ST141).

The predetermined number (here, k) is the number of bits necessary for the correlation calculation.

The predetermined number is referred to as a calculable number.

Here, when an M-sequence code pattern generating polynomial is constituted by N stages of shift registers, the minimum number of codes necessary for obtaining the absolute position is continuous N number of codes.

Thus, the necessary minimum calculable number is at least continuous 2×N bits.

However, it is highly unlikely to obtain the number of continuous bits because the masking due to dirt is randomly inserted.

Thus, the total number of bits which are not continued due to the masking is to be 2×N bits.

However, taking the error rate of the dirt determination (ST130A) into consideration, it is preferable that the calculable number is set so that the minimum number has a margin.

When the present embodiment is not used, it is common to have redundancy to be about four times the theoretical minimum number.

In the present embodiment, the calculable number may be set within a range so as to be one to three times the theoretical minimum number.

Preferably, the calculable number is to be 1.5 to 2.5 times the theoretical minimum number, and more preferably, to be 1.5 to 2.0 times.

Naturally, when the accuracy of the dirt determination is extremely high, the calculable number can be set within a range so as to be 1.1 to 1.3 times the theoretical minimum number.

When the data necessary for the correlation calculation is prepared (ST141: YES), the quantization (and the dirt determination) is terminated (ST140: YES), and the processing proceeds to the coding (ST150). On the other hand, when the number of unmasked bits does not reach the predetermined number (ST141: NO), it is determined whether the parameter n reaches the upper limit number of bits (ST142).

When the number of bits reaches the upper limit number, the processing is terminated (ST142: YES). When the data necessary for the correlation calculation is not obtained (ST141: NO) and the number of bits reaches the upper limit number (ST142: YES), the scale is too dirty, and the reliable correlation calculation cannot be performed. Therefore, an alert of scale dirt is notified to a user (ST143).

When the parameter n does not reach the upper limit number of bits (ST142: NO), the quantization (ST121) and the dirt determination (ST130A) are successively performed (ST140: NO, ST145). Following the coding (ST150), the correlation calculation (ST160) is the same as that in the second exemplary embodiment, and the description thereof is omitted.

According to the third exemplary embodiment, when the quantized values having high reliability necessary for the correlation calculation are obtained, the processing of the quantization and coding is terminated. Thus, it is possible to accelerate the calculation processing and to reduce the load on the signal processing unit. Furthermore, the number of codes used for the correlation calculation is reduced, the effects on accelerating the calculation processing and reducing the load on the signal processing unit are remarkably large.

Note that, the present invention is not limited to the above embodiments, and can be changed without deviating from the scope.

It has been described that the masking is not performed (OFF) when the reliability of the quantized values is high (ST135), and the masking is performed (ON) when the quantized values are not reliable (ST136), but this is merely an example. A flag indicating high reliability or unreliability may be used, any means can be used as long as the similar effect is obtained.

In the above embodiments, a linear scale and encoder have been exemplified, but the present invention can be applied to a rotary encoder.

It has been described that the inversion processing unit is set to OFF when used in the reflective photoelectric encoder and that the inversion processing unit is set to ON when used in the transmissive photoelectric encoder in the above embodiments. Naturally, this relates to the setting of the correlation calculation unit.

If the correlation calculation unit is fabricated on the assumption that the reflective type encoder is the standard, the inversion processing unit is set as above. However, the inversion processing unit is set inversely on the assumption that the transmissive type encoder is the standard.

In other words, on the assumption that the transmissive type encoder is the standard, the inversion processing unit is set to ON when used in the reflective photoelectric encoder, and the inversion processing unit is set to OFF when used in the transmissive photoelectric encoder.

In the above embodiments, the scale can be commonly used in the reflective type or the transmissive type by providing a chromium film reflecting part on a glass substrate, but the material of the scale is not limited.

For example, a reflecting part may be arranged on an elongate scale substrate made of transparent resin. The material of the reflecting part is not limited, and may be various metals, inorganic materials, or organic materials appropriately.

Then, it is difficult to determine which one of the light transmitting part or the light reflecting part has higher antifouling property, but it makes no difference in the present invention.

Although a part of the reflecting part is missing or a part of the transmitting part is missing, it is possible to eliminate an erroneous detection signal due to the missing pattern from the correlation calculation as long as the present invention is applied.

What is claimed is:

1. A photoelectric encoder comprising:
   a scale provided with a two-level code pattern according to a pseudo random code sequence along a length measurement direction; and
   a detection head part provided so as to be relatively movable along the scale and configured to detect an absolute position on the scale based on the pseudo random code sequence on the scale, wherein
   each code in the two-level code pattern consists of a combination of two bits,
   the two-level code pattern is represented using three or more bit-combination patterns,
   each code of the two-level code pattern indicates a code "1" or a code "0",
   each code includes two bits,
   each bit of the two bits is L or H,
   either one of a light reflecting part or a light transmitting part is arranged at a position equivalent to the L on the scale,
   the other one of the light reflecting part or the light transmitting part is arranged at a position equivalent to the H on the scale, and
   the detection head part comprising:
      a light source configured to irradiate the scale with light;
      an image acquiring unit configured to acquire a bright/dark detection image formed by light reflected by the scale or light transmitted through the scale;
      an inversion processing unit configured to perform inversion processing to the detection image; and
      a correlation calculation unit configured to perform, based on the pseudo random code sequence, correlation calculation to bit data of the detection image and to calculate the absolute position on the scale from a correlation peak.

2. The photoelectric encoder according to claim 1, wherein
   the inversion processing unit is set to ON when the correlation calculation unit is designed so as to perform the correlation calculation based on the detection image formed by the light reflected by the scale, and when the image acquiring unit acquires the detection image formed by the light transmitted through the scale,
   the inversion processing unit is set to ON when the correlation calculation unit is designed so as to perform the correlation calculation based on the detection image formed by the light transmitted through the scale, and when the image acquiring unit acquires the detection image formed by the light reflected by the scale,
   the inversion processing unit is set to OFF when the correlation calculation unit is designed so as to perform the correlation calculation based on the detection image formed by the light reflected by the scale, and the image acquiring unit acquires the detection image formed by the light reflected by the scale, and
   the inversion processing unit is set to OFF when the correlation calculation unit is designed so as to perform the correlation calculation based on the detection image formed by the light transmitted through the scale, and when the image acquiring unit acquires the detection image formed by the light transmitted through the scale.

3. The photoelectric encoder according to claim 1, wherein
   the inversion processing unit includes a setting selector switch configured to change ON/OFF setting of the inversion processing.

4. The photoelectric encoder according to claim 1, wherein
   the number of continuous L in the two-level code pattern is equal to or less than an upper limit value, and
   the number of continuous H in the two-level code pattern is equal to or less than an upper limit value.

5. The photoelectric encoder according to claim 1, wherein
   two or more bit-combination patterns of the two bits representing the code "0" are prepared, and
   a bit-combination pattern different from an adjacent bit-combination pattern is used when the codes "0" are continued.

6. The photoelectric encoder according to claim 5, wherein
   the code "1" and the code "0" are replaceable with each other.

* * * * *